(12) United States Patent
Tsushio et al.

(10) Patent No.: US 6,432,872 B1
(45) Date of Patent: *Aug. 13, 2002

(54) COMPOSITION FOR USE IN ADSORPTION TREATMENT, PRODUCTS FORMED WITH THE SAME, AND A METHOD FOR PRODUCING ADSORBENT USING THE SAME

(75) Inventors: Yoshinori Tsushio; Tuyoshi Nishijima; Taeko Shimizu; Ichiro Kitayama; Osamu Takayama; Hirosuke Sumida, all of Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/618,760

(22) Filed: Jul. 18, 2000

Related U.S. Application Data

(63) Continuation of application No. PCT/JP99/05211, filed on Sep. 24, 1999.

(30) Foreign Application Priority Data

| Dec. 11, 1998 | (JP) | 10-353519 |
| Jan. 28, 1999 | (JP) | 11-020498 |
| Feb. 26, 1999 | (JP) | 11-050910 |
| Feb. 26, 1999 | (JP) | 11-050984 |
| Feb. 26, 1999 | (JP) | 11-050988 |

(51) Int. Cl.[7] .................. B01J 20/00; B01J 20/22; B01J 20/02; B01J 20/10; B01J 20/12

(52) U.S. Cl. ................ 502/400; 502/401; 502/402; 502/404; 502/405; 502/407; 502/412; 502/415

(58) Field of Search .................. 502/400–402, 502/404, 405, 407, 412, 415

(56) References Cited

U.S. PATENT DOCUMENTS

| 5,432,214 A | 7/1995 | Lancesseur .......... 524/12 |
| 6,200,555 B1 * | 3/2001 | Nishijima et al. ...... 424/76.1 |

OTHER PUBLICATIONS

Patent Abstracts of Japan, vol.013, No. 299, Jul. 11, 1989 & JP 01 087871, Mar. 31, 1989, Abstract.
Patent Abstracts of Japan, vol.004, No. 089, Jun. 25, 1980 & JP 55 054034, Apr. 21, 1980, Abstract.
Database WPI, Derwent Publications Ltd., Longon, GB; AN 1989327430, XP002124327 & JP 01 242144 A (Yoshida T.), Mar. 19, 1988, Abstract.
Patent Abstracts of Japan, vol. 010, No. 004, Jan. 9, 1986 & JP 60 166020 A, Aug. 29, 1985, Abstract.
Database WPI, Derwent Publications Ltd., Longon, GB; AN 1988–025472 XP002124328 & JP 62 286464 A, Dec. 12, 1987, Abstract.
International Search Report.

* cited by examiner

Primary Examiner—Mark L. Bell
Assistant Examiner—Patricia L. Hailey
(74) Attorney, Agent, or Firm—Nixon Peabody LLP; Donald R. Studebaker

(57) ABSTRACT

An object of the present invention is to provide a composition for use in adsorption treatment which is easy to handle; a method for easily preparing the composition in the form of grains without inhibiting its adsorption ability; products such as an adsorption treatment device and a filter for air-cleaning formed with the composition; and a method of adsorption treatment. The composition for use in adsorption treatment of the present invention includes an adsorbing substance which is reactive with components to be adsorbed in the presence of moisture, a water-absorbing substance, and a binder, wherein the binder is 1.3 to 8 weight percent with respect to the water-absorbing substance.

33 Claims, 24 Drawing Sheets

COMPOSITION FOR USE IN ADSORPTION TREATMENT, PRODUCTS FORMED WITH THE SAME, AND A METHOD FOR PRODUCING ADSORBENT USING THE SAME

This is a continuation of International Application PCT/JP99/05211, with an international filing date Sep. 24, 1999.

BACKGROUND OF THE INVENTION

1. Field of the Invention

The present invention relates to a composition for use in an adsorption treatment capable of easily and efficiently adsorbing and removing components to be adsorbed such as odor components, for example, carbonyl groups-containing compounds such as aldehydes and ketones, and odorless and harmful gaseous components; a method for producing the same; and products formed with the same such as filters for air-cleaning. The technique of the present invention is especially effective in adsorbing and removing the above-described components from rooms of cars, houses and buildings.

2. Description of the Prior Art

At large equipment such as sewage treatment plants and thermal disposal plants in urban areas, odor components are removed from gases by use of sprinkler system cleaning device which uses washing water prepared by dissolving medicine reactive with odor components into water. At small and closed spaces such as toilets, rooms of houses and buildings, and rooms of cars, it is impossible to install a large-scale sprinkle system cleaning device. In these spaces, therefore, odor components are usually removed by use of physical adsorbents such as an activated charcoal.

It is confirmed that, in a car, there are gases generated when fuels and oils decompose, combustion products from cigarettes, malodorous or odorless and harmful gaseous components such as organic compounds evaporating from adhesives used for adhesion of interior boards and interior parts, and heat insulating foamed resins. In rooms of houses and buildings, there are combustion products from cigarettes, and harmful gaseous components evaporated from heat insulating materials, plywood, and adhesives. These harmful gaseous components recently constitute a problem of sick house.

These malodorous or odorless and harmful gaseous components (hereinafter, these are simply referred to as gaseous components in some cases) contain carbonyl group-containing compounds such as formaldehyde, acetaldehyde, acrolein, and benzaldehyde. As described above, air-cleaners for use in toilets, rooms of houses and buildings, and in cars usually contain physical adsorbents such as an activated charcoal; however, an activated charcoal is not capable of sufficiently adsorbing the carbonyl group-containing compounds.

The physical adsorbents such as an activated charcoal have other problems. The physical adsorbents have adsorption sites, and when they adsorb and remove the components to be adsorbed from the gas, they capture the components into the adsorption sites. At this time, the physical adsorbents also adsorb moisture (i.e. water) in the gas together with the components. If the adsorption sites are saturated with the moisture, the components cannot be sufficiently adsorbed. On top of this, the physical adsorbents release the components which it once adsorbed when it is subjected to high temperature.

In order to develop an adsorbent capable of sufficiently adsorbing gaseous components when it is used in a room of house where moisture is present and in a car where its room temperature may become high by sunlight, various studies have been conducted. The present inventors have found that a phenol compound is reactive with the above-describe carbonyl-group containing compounds in the presence of moisture. They have made an invention directed to a composition containing the phenol compounds and a water adsorbing substance for carrying the phenol compounds, and have already filed an application for the invention (Japanese patent application No. 10-271386)

The composition disclosed in Japanese patent application No. 10-271386 is in the form of fine particles. When the composition is used in an adsorption treatment device or a filter for air-cleaning, it is interposed between permeable members. A material with tight surface is not preferable for interposing the composition in order to keep high permeability and high treatment efficiency, and therefore, a material having a large number of pores with a certain diameter is used for the permeable member. For example, a non-woven cloth with a low density is used as the permeable material. In this case, if the composition has a small particle diameter, the composition falls through the pores of the non-woven cloth. The adsorbent with such a problem does not have a commercial value or does not sufficiently adsorb components to be adsorbed.

In order to avoid the above problem, the composition is preferably in the form of grains larger than fine particles. In addition, the composition in the form of grains is easy to handle, and contributes to keep the working environment clean. In such a situation, there is a demand for finding out the conditions for preparing the adsorption treatment composition in the form of grains with a certain size.

SUMMARY OF INVENTION

The present invention has been achieved in view of the foregoing. An objective of the present invention is to provide a composition for use in adsorption treatment which is easy to handle; a method for easily preparing the composition in the form of grains without inhibiting its adsorption ability; products such as an adsorption treatment device and a filter for air-cleaning formed with the composition; and a method of adsorption treatment.

According to the present invention, the composition for use in adsorption treatment includes an adsorbing substance reactive with components to be adsorbed in the presence of moisture, a water-absorbing substance, and a binder. The weight of the binder is 1.3 to 8 percent with respect to the weight of the water-absorbing substance. Through the use of these substances blended at this weight ratio, the resultant composition is formed into grains having high strength without losing its adsorption ability.

DETAILED DESCRIPTION OF THE PREFERRED EMBODIMENT OF THE INVENTION

Figure 1:
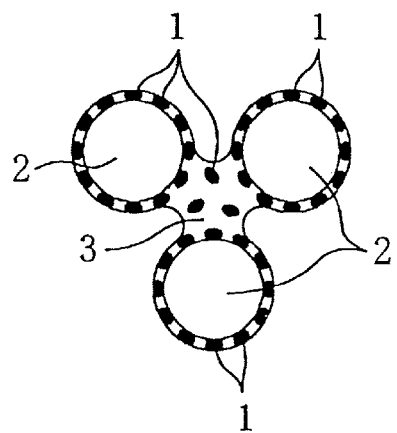
FIG. 1 is a diagram schematically showing an adsorbent for use in adsorption treatment prepared by a production method according to an embodiment of the present invention.

A composition for use in adsorption treatment of the present invention contains, as essential components, an adsorbing substance which is chemically reactive with components to be adsorbed in the presence of moisture and adsorbs them, a water-absorbing substance, and a binder.

The weight of the binder is 1.3 to 8 percent with respect to the weight of the water-absorbing substance. If the weight of the binder is less than 1.3 percent, the grains of the composition are easily crushed even with the application of a weak force. It useless, therefore, to form the composition into the form of grains. Contrary to this, if the weight of the binder is more than 8 percent, the binder coats a large number of particles of the adsorbing substance and water-absorbing substance, and impairs their adsorption activity. The resultant composition has poor adsorption ability. In addition, a problem arises from the use of the binder of more than 8 weight percent if the binder is a water-soluble polymer and it is mixed with an aqueous solution of the adsorbing substance. This is because the viscosity of the system increases and the system becomes viscous. From the viscous system, it is difficult to form desirable grains of the composition. More preferably, the upper limit of the weight of the binder is 5 percent, and the most preferably 3 percent with respect to the weight of the adsorbing compound.

As the binder, a water-soluble polymer is preferable. By using a water-soluble polymer, the composition in the form of grains can be produced with no need of using an organic solvent. As the adsorbing substance, phenol compounds are typically used, and most of them are water-soluble. By use of water-soluble binder and adsorbing substance, the composition in the form of grains can be easily produced by mixing three components: the water-dissolved polymer, the adsorbing substance and the water-absorbing substance. Examples of the water-soluble polymer include polyacrylic acid, polyvinyl alcohol, and carboxymethyl cellulose. Among them, polyvinyl alcohol is the most preferable, because it forms grains with high strength even if it is used in a small amount. In the production of the composition in the form of grains, if the water-absorbing substance is not sufficiently wet, a small amount of a surface active agent may be added.

Conventionally, the following methods have been employed in producing the composition in the form of grains. In one method, the water-absorbing substance, the adsorbing compound, and the binder are simultaneously mixed with each other. In another method, the adsorbing substance, which actually adsorbs the components to be adsorbed, is mixed with the water-absorbing substance with each other so that the water-absorbing substance carries the adsorbing substance. After that, the resultant mixture is mixed with the binder.

However, the composition produced by these methods has a poor adsorption ability, because the adsorption activity of the adsorbing substance is impaired by the binder for the following reason. In the composition, the adsorbing substance is carried by the water-absorbing substance, and the layer of the binder is formed thereon. A large number of particles of the adsorbing substance is coated with the binder, and the binder layer interferes with the reaction between the adsorbing substance and the components to be adsorbed. As a result, the adsorbing substance cannot sufficiently conduct its adsorbing activity.

Contrary to this, the composition prepared by the method of the present invention has high adsorbing ability, because the binder never interferes with the reaction between the adsorbing substance and the components to be adsorbed, and the adsorbing substance conducts sufficient adsorbing activity. The method of the present invention uses the adsorbing substance which is reactive with the components to be adsorbed in the gas to be treated in the presence of moisture, and the water-absorbing substance which carries the adsorbing substance and supplies moisture thereto at the time of reaction. In the method of the present invention, the adsorbing substance is substantially uniformly mixed with the binder, and the mixture is mixed with the water-absorbing substance. The particles of the adsorbing substance uniformly disperse in the binder, and the binder in this state forms a layer around the water-absorbing substance so as to attach its particles with each other, thereby forming the grains of composition. In the composition, a large number of particles of the adsorbing substance are carried by the water-absorbing substance in the state of partially exposed without coated with the binder. Due to this structure, the adsorbing substance reacts with the components to be adsorbed well, and the deterioration of the adsorbing ability of the composition by the binder is avoided.

The binder is water-soluble, hydrophilic, and water-permeable. When the binder is mixed with the adsorbing substance, the binder is dissolved in water to prepare an aqueous solution, and the aqueous solution is mixed with the adsorbing substance.

The preparation of the aqueous solution of the binder is advantageous on the following points. First, the binder itself absorbs moisture and supplies the moisture to the adsorbing substance at the time of reaction, as the water-absorbing substance does. The supply of the sufficient moisture enhances the adsorbing ability of the adsorbing substance, and in turn, of the adsorbent. On top of this, the grains of the composition is easily formed, and the particles of the water-absorbing substance are firmly bound to each other.

As the adsorbing substance, a water-soluble substance is used. By mixing the water-soluble substance with the aqueous solution of the binder, the formation of grains is more simplified. Furthermore, the water-soluble adsorbing substance is firmly carried by the water-absorbing substance.

Alternatively, another method may be employed for producing the composition of the present invention. In this method, the water-absorbing substance is mixed with the binder for attaching the particles of the water-absorbing substance with each other to form the grains thereof. The grains of the water-absorbing substance are mixed with the adsorbing substance so that the adsorbing substance is carried by the water-absorbing substance.

In this method, the adsorbing substance is carried by the water-absorbing substance via the binder, or is directly carried by the water-absorbing substance in the area where no binder is present. The particles of the adsorbing substance are not completely coated with the binder, and the reactivity of the adsorbing substance with the components to be adsorbed is kept to be high. As a result, high adsorbing ability is given to the adsorbent, as in the method described above.

In the presence of moisture, the adsorbing substance shows especially high adsorbing ability for carbonyl group-containing compounds such as formaldehydes, acetaldehydes, acroleins, and benzaldehydes in the air. The adsorbing substance contains active hydrogen which shows addition reaction for carbonyl groups, and adsorbs and removes the carbonyl group-containing compounds by chemical reaction. Specific examples of the adsorbing substance include monohydric phenols such as hydroxybenzoic acid, eugenol, 3,5-, 2,5-, 3,4-xylenol, dihydric phenols such as resorcin, bisphenol A, and catechol, trihydric phenols such as pyrogallol, purpurin, and naringin, tetrahydric phenols such as rutin. The adsorbing substance surely adsorbs carbonyl group-containing compounds such as aldehydes and ketones as unreactive compounds by way of chemical reaction. It generates neither strong odor nor highly-corrosive ions, and never sublimates, unlike the compounds capable of adsorbing aldehydes such as amines and ammonias. Due to these advantages, no problem arises in using the adsorbing substance for an adsorbent. Particularly, polyhydric phenols are preferable because their reacting speed at the room temperature is fast and most of them are odorless.

The size of the grains of the composition is not specifically limited, and is properly determined in accordance with each application. Preferable average diameter thereof is 0.1 to 1 mm taking into consideration the surface area of the grains which influences the adsorption treatment efficiency, ventilation resistance, and easiness of handling. If the composition is produced by a known production method and its grains have a diameter of larger than 1 mm, they are crushed and are sifted to selectively obtain grains with a diameter of 0.1 to 1 mm.

FIG. 1 is a diagram schematically showing the adsorbent produced in accordance with the present invention. The adsorbent contains an adsorbing substance 1 which reacts with the components to be adsorbed in a gas in the presence of moisture to adsorb them, and a water-absorbing substance 2 which carries the adsorbing substance 1 and supplies moisture to the adsorbing substance 1 when the adsorbing substance 1 reacts with the components to be adsorbed.

The water-absorbing substance 2 is not limited to a specific kind as far as it is not reactive with the adsorbing substance 1 and absorbs moisture in the gas to be treated. Preferably, the water-absorbing substance 2 is at least one of water-adsorbing inorganic substances and water-absorbing polymers. On the water-absorbing substance 2, the adsorbing substance 1 and the components to be adsorbed are chemically reacted with each other in the presence of moisture. The water-absorbing substance 2 has a water-absorbing ability, and absorbs the moisture in the air. The moisture absorbed by the water-absorbing substance 2 is supplied to the adsorbing substance 1, and therefore, the reaction between the adsorbing substance 1 and the components to be adsorbed proceeds with high efficiency with no need to additionally supply moisture. The water-absorbing substance 2 also serves as a carrier of the adsorbing substance 1, as well as a field for chemical reaction between the adsorbing substance 1 and the components to be adsorbed. The adsorbent with this structure is easy to handle.

Preferable examples of the water-absorbing inorganic substance include silica gel, zeolite, alumina, silious earth, and activated charcoal which are generally used as inorganic carriers. These may be used alone or in combination of two or more of them. Zeolite is categorized into two types in accordance with its ion types: Na-type and H-type (that is, proton-type). Among them, H-type zeolite is preferable, because it increases the reactivity between the adsorbing substance 1 and the components to be adsorbed (especially carbonyl group-containing compound). Zeolite is also categorized into several types in accordance its crystal structures: A-type (an average pore diameter: about $2.5 \times 10^{-10}$ m); ZSM5-type (an average pore diameter: about $5.5 \times 10^{-10}$ m); Y-type (an average pore diameter: about $6 \times 10^{-10}$ m); and X-type (an average pore diameter: about $10 \times 10^{-10}$ m), and the like. Among them, ZSM5-type zeolite is preferable, because it increases the reactivity between the adsorbing substance 1 and the components to be adsorbed (especially carbonyl group-containing compounds). The H- and ASM5-type zeolite is the most optimum as the water-absorbing substance 2. There is also a reason why the use of zeolite is preferable and is recommended as follows. When the adsorbing substance 1 is used together with a weak acidic substance or a weak basic substance, there is a fear that an acid generated from the weak acidic substance or an alkaline generated from the weak basic substance in the presence of moisture causes an acid corrosion or an alkaline corrosion on the adsorption treatment device and appliances attached thereto. The problem of the corrosion can be prevented through the use of H-type zeolite which is a solid acid substance, or Na-type zeolite which is a solid basic substance.

Preferable examples of the water-absorbing polymers used as the water-absorbing substance include: acrylic acid or the salt thereof; polymers or copolymers of acrylamide, maleic acid, ethylene oxide, and vinyl alcohol; modified starch; and modified cellulose. More preferable examples thereof include: polyacrylate; copolymers of acrylic acid and vinyl alcohol or acrylic acid ester or the salt thereof; polymer of acryl amide; polyethylene oxide; salt of copolymers of maleic acid and isobutylene; and graft modified acrylate of starch or carboxy cellulose. These may be used alone or in combination of two or more of them.

As the adsorbing substance 1, a compound which shows an adsorbing ability in the presence of moisture is used. The adsorbing substance 1 contains active hydrogen which shows an addition reactivity against carbonyl groups. When the adsorbing substance 1 is used for treating the gas containing carbonyl group-containing compounds such as formaldehyde, acetaldehyde, acrolein, and benzaldehyde, it chemically reacts with the carbonyl group-containing compounds to adsorb and remove them. The adsorbing substance 1 which shows an addition reactivity against the carbonyl groups is at least one of monohydric phenol, polyhydric phenol or derivatives thereof. Specific examples thereof include: monohydric phenol such as hydroxybenzoic acid, eugenol, and 3,5-, 2,5-, 3,4-xylenol; dihydric phenols such as resorcin, bisphenol A, and catechol; trihydric phenols such as pyrogallol, purpurin, and naringin; and tetrahydric phenols such as rutin.

The adsorbing substance 1 which shows an addition reactivity with carbonyl groups strongly adsorbs the carbonyl group-containing compounds with high efficiency. The compounds, once adsorbed and reacted with the adsorbing substance 1, are incorporated into the adsorbing substance 1 as an unreactive compound, and are never released alone. The adsorption activity proceeds in the presence of moisture, and therefore, is never inhibited by the moisture in the air. Unlike the amine compounds and ammonia compounds capable of adsorbing aldehydes, the adsorbing substance 1 itself generates neither strong odor nor highly-corrosive ions, and does not sublime. There is no problem in putting the adsorbing substance 1 into practical use. In other words, although amine compounds and ammonia compounds can adsorb aldehydes, they have problems of strong odor, corrosion, and sublimation. Contrary to this, the adsorbing substance 1 using the phenol compounds are free from these problems, and are adequate for practical use. Especially, in case of using at the room temperature, odorless polyhydric phenols which have fast reacting speeds at the room temperature are preferable. Depending on the choice of which compounds to use as the adsorbing substance 1, it is also possible to adsorb malodorous compounds other than carbonyl group-containing compounds and odorless and harmful compounds.

Among the compounds usable as the adsorbing substance 1, resorcin, which is a kind of polyhydric phenol, is the most optimum, because it shows excellent reactivity with the carbonyl group-containing compounds. When resorcin is used together with weak acidic substance such as oxalic acid or a weak basic substance such as sodium carbonate, aldehydes are more strongly captured, and adsorption activity is further enhanced. The reason of this effect is that the weak acidic substance and the weak basic substance act as catalysts when resorcin reacts with aldehydes (especially formaldehydes). The same effect can be fully obtained when monohydric phenol and polyhydric phenol other than resorcin are used as the adsorbing substance 1.

The weight ratio between the adsorbing substance 1 and the water-absorbing substance 2 is determined taking into consideration their adsorption activities, carrying amounts when they are saturated, and adsorption abilities required for them. Preferably, the weight of the adsorbing substance 1 is 0.1 to 50 percent with respect to the weight of the water-absorbing substance 2. If the weight ratio is less than 0.1 percent, the adsorbing substance 1 does not show sufficient adsorption. Contrary to this, if the weight ratio is larger than 50 percent, the adsorption ability is saturated and further adsorption cannot be expected. In addition, the use of adsorbing substance 1 in an excessive amount is likely to impair the formation of grains, as will be described later. More preferable upper limit of the weight ratio is 20 percent, and the most preferably 10 percent. More preferable lower limit thereof is 1 percent, and the most preferably 5 percent, in order to attain good adsorption.

The adsorbent is produced into the form of grains by attaching the particles of the water-absorbing substance 2 to each other by the binder 3. The adsorbent in the form of grains is easy to handle, and when it is interposed between air-permeable members to form a filter for air-cleaning, the adsorbent never drops through the holes of the members even if the members have a rough mesh.

The process of producing the adsorption treatment agent is as follows. First, the adsorbing substance 1 and the binder 3 are mixed with each other. As the binder, a water-soluble, hydrophilic, and water-permeable substance is preferably used. Examples of the binder 3 include polyacrylic acid, polyvinyl alcohol, and carboxymethyl cellulose. Among them, polyvinyl alcohol is the most optimum, because grains with high strength can be produced even if its use amount is small.

In the present invention, the binder 3 preferably is a water-soluble, hydrophilic, and water-permeable substance.

Before being mixed with the adsorbing substance 1, the binder 3 is preferably dissolved in water to prepare an aqueous solution.

The binder 3 dissolved in water firmly attaches the particles of the water-absorbing substance 2 to each other, and facilitates the formation of grains. In addition, the adsorbing substance 1 preferably is water-soluble as well, and is dissolved in the aqueous solution of the binder 3. By mixing the water-absorbing substance 2 with this aqueous solution, it can carry larger number of particles of the adsorbing substance 1, and the formation of the grains is further facilitated. A most of phenol compounds such as resorcin are water-soluble, and from this point of view, phenol compounds are suitable for the adsorbent of the present invention.

Figure 2:
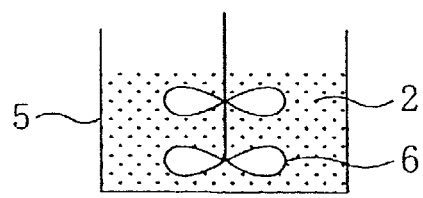
FIG. 2 is a schematic diagram showing a state where a water-absorbing substance in the form of powder is put into a vessel and is stirred with stirring blades.

After mixing the mixture of the adsorbing substance 1 and the binder 3 with the water-absorbing substance 2, the resultant composition is formed into grains. The grains may be formed by known methods such as extrusion molding and high speed mixing granulation. In the case of preparing the aqueous solution of the adsorbing substance 1 and the binder 3 as described above, easier method may be employed. As shown in FIG. 2, the water-absorbing substance 2 in the form of powder is put into a vessel 5. In the state where the water-absorbing substance 2 is stirred with stirring blades 6, the aqueous solution is pored thereto in a constant amount per a specific time. In this simple manner, the composition in the form of grains is obtained.

As described above, the adsorbing substance 1 and the binder 3 are mixed with each other, and after that, the mixture is mixed with the water-absorbing substance 2 to form grains.

Figure 3:
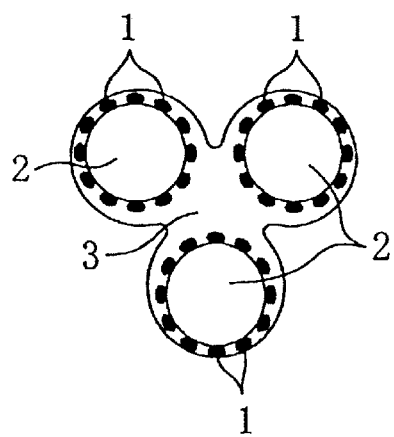
FIG. 3 is a diagram schematically showing an adsorbent for use in adsorption treatment prepared by mixing an adsorbing substance and water absorbing substance with each other, and then mixing the mixture with a binder.

This process is advantageous in that the adsorption ability of the adsorbent is never impaired by the binder 3. In a conventional method, the adsorbing substance 1 is mixed with the water-absorbing substance 2, so that the water-absorbing substance 2 carries the adsorbing substance 1. Then, the mixture is mixed with the binder 3, and the resultant composition is formed into grains by a know granulation method. This method, however, is disadvantageous in that, as schematically shown in FIG. 3, a layer of the binder 3 is formed to cover a large number of the particles of the adsorbing substance 1 carried by the water-absorbing substance 2. The binder 3 interferes with the contact between the adsorbing substance 1 and the components to be adsorbed, and impairs the reaction between them. Contrary to this, in the method of the present invention, the binder is substantially uniformly mixed with the adsorbing substance 1, and the particles of the adsorbing substance 1 uniformly disperse in the binder 3. The binder, when it is mixed with the water-absorbing substance 2, forms a layer around the water-absorbing substance 2 carrying the adsorbing substance 1. Whereas the particles of the adsorbing substance 1 positioned in the area where the particles of the water-soluble substance 2 are attached to each other by the binder 3 is coated with the binder 3, a large number of the particles of the adsorbing substance 1 can be refrain from being coated with the binder and carried by the water-absorbing substance 1 in the state of being partially exposed. In this structure, the contact between the particles of the adsorbing substance 1 and the components to be adsorbed is not interfered with the binder 3, and the reactivity between them is kept to be high.

There is also another method for producing the adsorbent in the form of grains. In this method, the water-absorbing substance 2 is mixed with the binder 3, so that the particles of the water-absorbing substance 2 are attached to each other by the binder 3 to form grains. Then, the grains are mixed with the adsorbing substance 1 to allow the water-absorbing substance 2 to carry the adsorbing substance 1. Specifically, the binder 3 is dissolved in water to prepare an aqueous solution, and the water-absorbing substance in the form of powder is put into a vessel. In the state where the water-absorbing substance is stirred with the stirring blades 6, the aqueous solution is pored thereto so that the particles of the water-absorbing substance 2 are attached to each other to form grains, as is the case of the previously described method which uses the aqueous solution of the adsorbing substance 1 and the binder. Subsequently, the adsorbing substance 1 is dissolved in water to prepare an aqueous solution, and the grains are soaked into the aqueous solution to allow the water-absorbing substance 2 to carry the adsorbing substance 1. The resultant is dried, and the adsorbent in the form of grains is obtained. In this method, some of the adsorbing substance 1 is carried by the water-absorbing substance 2 via the binder 3, and some of the adsorbing substance 1 is directly carried by the water-absorbing substance 2 in the area where no binder 3 is present. This structure prevents the adsorbing substance 1 from being completely coated with the binder 3.

In the grains of the adsorbent, moisture may or may not be present. When moisture is not present in the adsorbent, the water-absorbing substance 2 absorbs moisture in the air and supplies the moisture to the agent, and therefore, there is no need to additionally supply moisture to the agent. When a strong adsorption is required from the beginning of the adsorption treatment, it is desirable that water is supplied to the adsorbent so that the water-absorbing substance 2 absorbs an adequate amount of moisture before the adsorption treatment is started.

The size of grains is not specifically limited, and is determined in accordance with each application. Preferable average diameter thereof is 0.1 to 1 mm taking into consideration the surface area of the grains which influences the adsorption treatment efficiency, ventilation resistance, and easiness of handling. When the grains prepared by the above-described methods have a diameter of larger than 1 mm, they are crushed and are sifted to obtain the grains with average diameter of 0.1 to 1 mm.

The adsorbent in the form of grains is easy to handle. When it is interposed between air-permeable members to form a filter for air-cleaning, the adsorbent never drops of the holes of the members. By determining the weight of the binder to 1.3 to 8 percent with respect to the weight of the water-absorbing substance 2, an excellent adsorption can be attained. Within this weight ratio, the grains of the adsorbent are never crushed and broken even when it is interposed between air-permeable members, and then, is formed into, for example, a corrugated shape by the application of pressure.

As described above, the adsorbent of the present invention is produced into the form of grains with a desirable size. As compared with an adsorbent in the form of powder, the adsorbent in the form of grains is preferable for working environment and is easy to handle. Hereinafter, an adsorption treatment device and a filter for air-cleaning formed with the adsorbent of the present invention will be described.

The adsorption treatment device of the present invention includes, as an essential member, an adsorption treatment part which is formed with a proper vessel filled with the adsorbent of the present invention. A gas to be treated is passed through the adsorption treatment part, and the components to be adsorbed in the gas are adsorbed by the adsorbent and are removed from the gas with efficiency. As a result, the gas is purified into a harmless and odorless gas. If a fan is mounted at proper positions in front or in the rear of the adsorption treatment part and is rotated, the gas to be treated is smoothly introduced into the adsorption treatment part. The efficiency of adsorption treatment is enhanced by adjusting the rotation speed of the fan to a proper level in accordance with the concentration of the components to be adsorbed in the gas. It is preferable that the adsorption treatment device is placed in such a manner that the adsorption treatment part thereof is located in front or in the rear of the air-conditioner installed in a room of house, building, and car, because the fan of the air-conditioner can be used for adsorption treatment as well.

The adsorption treatment device with a fan may be mounted on a ceiling or behind the rear seat in a car, or a room of house and building. The air in the room of the car, house, and building is purified while being circulated by the fan. It is preferable to combine the adsorption treatment part and the filter for dust removal into one piece unit. It is also preferable that the filter for dust removal is placed in front or in the rear of the adsorption treatment in a direction along which the air is sent, so that the adsorption treatment and dust removal can be conducted simultaneously.

Figure 4:
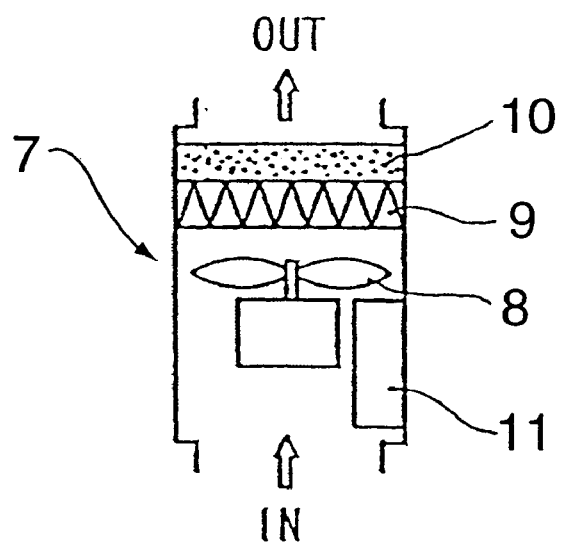
FIG. 4 is a conceptual diagram showing a specific example of an adsorption treatment device of the present invention.
Figure 5:
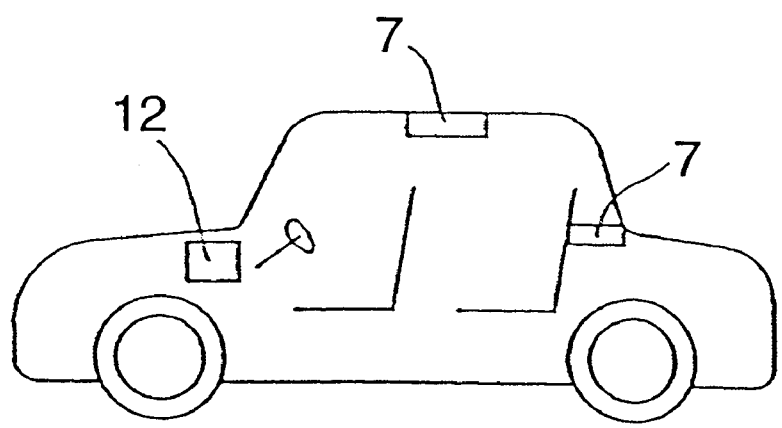
FIG. 5 is a diagram showing the position of the adsorption treatment device installed in a car.

FIG. 4 is a conceptual diagram showing an example of an adsorption treatment device in a circulation system. An adsorption treatment device 7 includes a fan 8 for sending air, and a filter 9 for dust removal and an adsorption treatment part 10 placed in this order on the downstream side of the fan 8. The fan 8 is rotated to suck the gas to be treated into the adsorption treatment device 7, and the gas is passed through the dust removal filter 9 and the adsorption treatment part 10 to remove the dust and the components to be adsorbed from the gas. In FIG. 4, the reference numeral 11 denotes a sensor. The sensor 11 detects the degree of contamination of the gas to be treated. The sensor 11 automatically detects whether or not the contamination of the gas reaches a specific level, and if it reaches the specific level, the fan 8 is started. By mounting the adsorption treatment device 7 structured as described above on a ceiling or on a backside of the rear seat of a car as shown in FIG. 5 for example, the air in the car is always kept to be clean.

Figure 6:
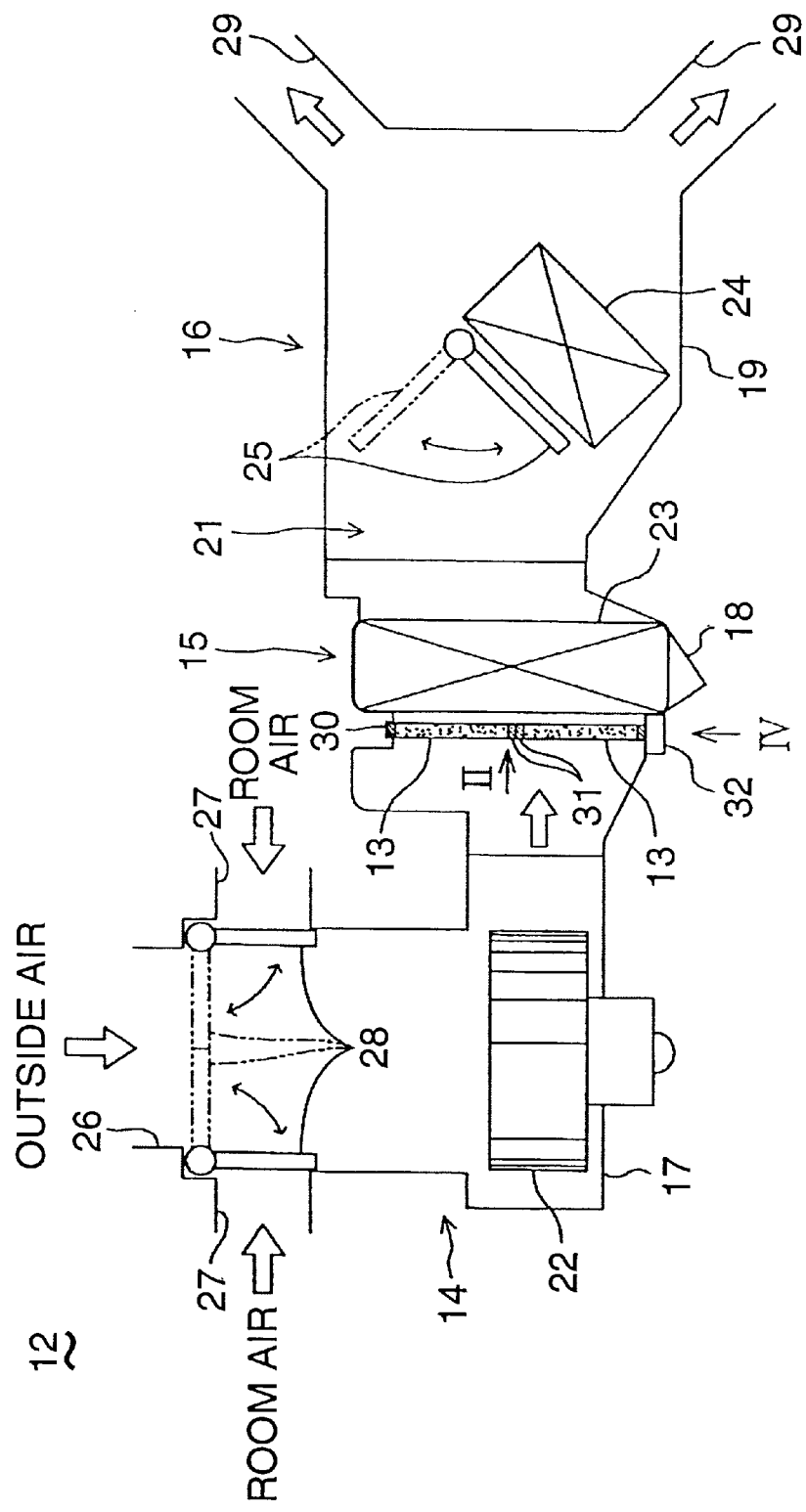
FIG. 6 is a schematic cross-sectional view showing an air-conditioner equipped with a filter for use in adsorption treatment produced according to an embodiment of the present invention.

FIG. 6 is a diagram showing an air-conditioner 12 for use in a car. The air-conditioner 12 is formed with a filter 13 containing the adsorption treatment agent of the present invention. The air-conditioner 12 includes, in its path 21, a blower 22, an evaporator 23 placed on the downstream side of the blower 22, and a heater 24 placed on the downstream side of the evaporator 23. On the immediately upstream side the heater 24, an adjusting damper 25 for adjusting the amount of air to be passed through the heater 24 is placed.

At the upstream end of the path 21, an inlet 26 for introducing the air from the outside of the room and an inlets 27 for introducing the air from the room are formed, and they are opened and closed by switching dampers 28. When the outside air inlet 26 is closed by the switching dampers 28, the room air is introduced into the path 21, and when the room air inlet 27 is closed by the switching dampers 28, the outside air is introduced into the path 21. At the downstream end of the path 21, outlets 29 for blowing out the conditioned air through the center console into the car are formed.

The air-conditioner 12 is constituted with three units: a blower unit 14; a cooling unit 15; and heater unit 16. The blower unit 14 includes the main body 17 of the blower unit which constitutes the path 21, the blower 22, the outside air inlet 26, the room air inlets 27, and the switching dampers 28. The cooling unit 15 includes a main body 18 of the cooling unit which constitutes the path 21 and the evaporator 23. The heater unit 16 includes a main body 19 of the heater unit which constitutes the path 21, the heater 24, the adjusting damper 25, and the outlets 29.

Figure 7:
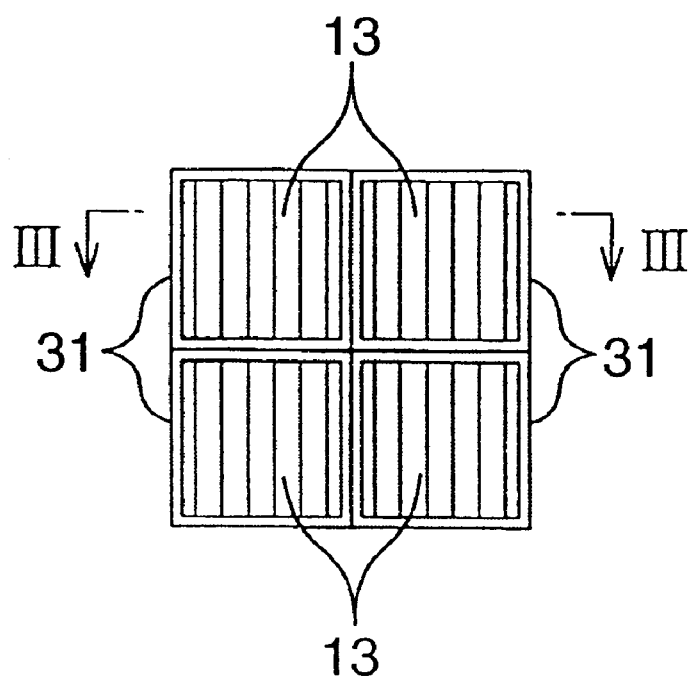
FIG. 7 is a view seen along the direction II of FIG. 6.

In the path 21 of the cooling unit main body 18, a filter attachment part 30 is formed between the blower 22 and the evaporator 23. To the filter attachment part 30, four filters 13 in the form of sheet are attached. The four filters 13 are arranged in two by two in a row and column as shown in FIG. 7. The air (i.e. the gas to be treated) is sent in one direction (i.e. from the left side to the right side in FIG. 6) passes through the filters 13, and the components to be adsorbed are adsorbed therefrom by the filters 13. After passing through the filters 13, the air is sent to the evaporator 23 and the heater 24. The evaporator 23 cools the air by heat of evaporation generated when cooling medium evaporates. The heater 24 heats the air using the water for cooling the engine. The air is purified and conditioned, and is blown into the car.

Figure 8:
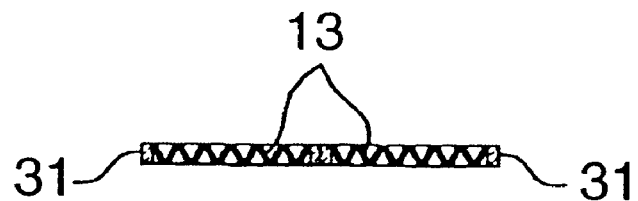
FIG. 8 is a linear cross-sectional view taken along the line III—III in FIG. 7.

As shown in FIG. 8, each filter 13 has a corrugated shape seen from the above. In addition, each filter 13 is fit inside a frame 31 made of a resin, and is supported by the frame 31 so as not to be bent.

Figure 9:
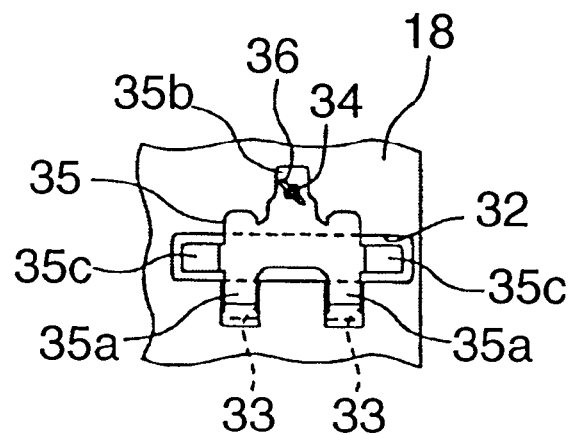
FIG. 9 is a view seen along the direction IV of FIG. 6.

On the bottom surface of the cooling unit main body 18, an opening 32 for exchanging the filters 13 and the frames 31 is formed at the position below the filter attachment part 30, as shown in FIG. 9. Specifically, The opening 32 is formed at the position immediately below the two filters 13 located on the right side in FIG. 7. At the time when it is necessary to exchange the filters 13 located on the left side in FIG. 7, the filters 13 on the right side are taken out from the opening 32, and then, the filters 13 on the left side are shifted to the right side and are taken out from the opening 32.

In the vicinity of the opening 32, two engagement holes 33 are formed on the opposite side of a screw 34 in the state where the opening 32 is interposed between them. To the engagement holes 33, engagement parts 35a of a filter fixing member 35 are engaged. To the screw 34, a butterfly nut 36 is screwed via a tightening part 35b of the filter fixing member 35. In this manner, the filter fixing member 35 is fixed to an outer bottom surface of the cooling unit main body 18 in the state of partially closing the opening 32. On the left and right sides of the filter fixing member 35, filter fixing parts 35c are provided. The filter 13 fitted to the frame 31 is fixed to the filter fixing parts 35c, and in this manner, is fixedly attached to the filter attachment part 30.

Figure 10:
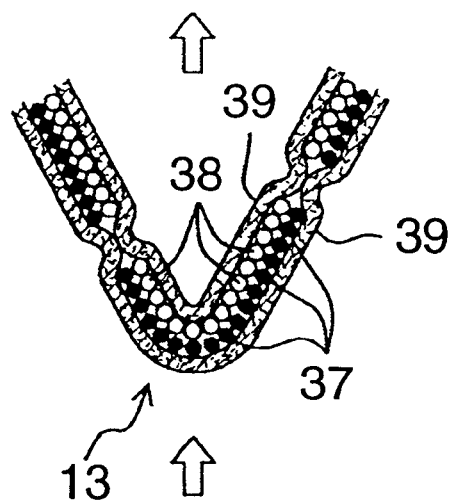
FIG. 10 is an enlarged sectional view showing a part of the inside of the filter of FIG. 8.

FIG. 10 is an enlarged cross-sectional view of a part of the filters 13. As shown in FIG. 10, in each filter 13, a physical adsorbent 37 and a chemical adsorbent 38 are charged in the state of being close to each other. The physical adsorbent 37 is arranged on the upstream side of the flow of the air for air-conditioning (shown by the arrow in FIG. 10), and the chemical adsorbent 38 is arranged on the downstream side. The physical adsorbent 37 and the chemical adsorbent 38 are interposed between two permeable members 39 which constitutes side surfaces of the filter 13 in its thickness direction. On the inner surface of the respective permeable members 39, a thermal fusing adhesive is applied beforehand. The adsorbents 37 and 38 interposed between the permeable members 39 are pressurized at high temperature. The adsorbents 37 and 38 are attached to the permeable members 39 with each other by the adhesive, and the permeable members 39 themselves are attached with each other at their peripheral portions (i.e. portions in contact with the frame 31) and other unspecified portions thereof. At the same time, each filters 13 is formed into a corrugated shape as described above by the application of pressure.

Each permeable member 39 is made of fiber-containing material such as filter paper and non-woven cloth. The permeable member 39 on the upstream side has an ability of removing dust and dirt from the air passing through. There is no need to additionally provide a dust removal filter, thereby simplifying the structure and lowering the air-flow resistance. When, however, a material having no dust removal ability is used as the permeable member 39 on the upstream side, a dust removal filter may be provided to the upstream surface of the permeable member 39 on the upstream side.

Figure 11A:
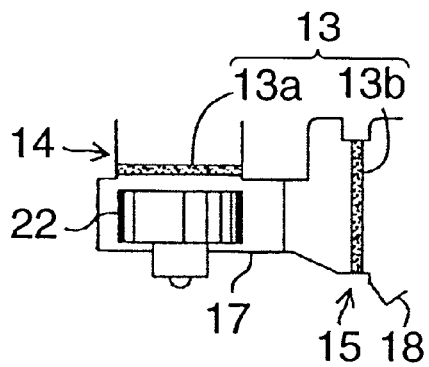
FIGS. 11A–11D are schematic cross-sectional views showing the area in the vicinity of air blower equipped with first and second filters.
Figure 11B:
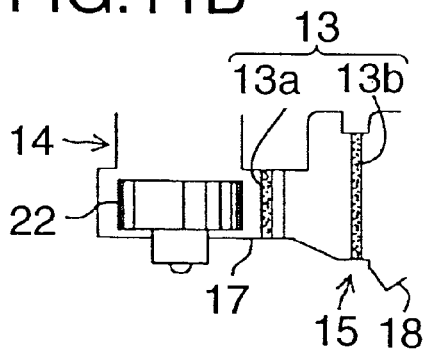
Figure 11C:
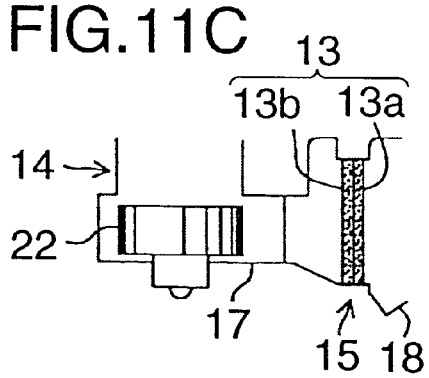
Figure 11D:
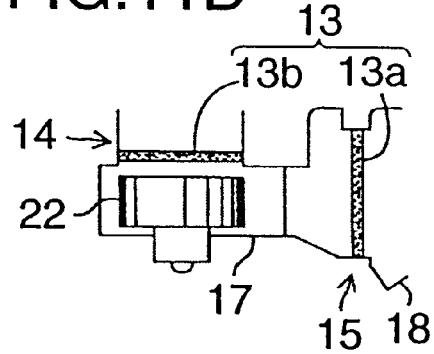

In the above description, the physical adsorbent 37 and the chemical adsorbent 38 are charged into the one same filter 13. It is also possible, as shown in FIGS. 11A to 11D, to use two kinds of filters 13a and 13b: in the first filter 13a, only the physical adsorbent 37 is charged; and in the second filter 13b, only the chemical adsorbent 38 is charged. In this case, as shown in FIG. 11A, the first filter 13a may be located on the upstream side of the blower 22, apart from the second filter 13b (the second filter 13b is located at the same position of the filters 13 in the above description). Alternatively, as shown in FIG. 11B, the first filters 13a may be located between the blower 22 and the second filter 13b. When the air-conditioner 12 in the car is in a non-operated state, the temperature in the car becomes high, and at high temperature, the physical adsorbent 37 (especially an active charcoal) tends to releases the components which it once adsorbed. However, when the air-conditioner having a structure of FIGS. 11A or 11B is started, the components released from the physical adsorbents 37 on the upstream side are adsorbed by the chemical adsorbent 38. Alternatively, as shown in FIG. 11C, the first and second filters 13a and 13b are located to be close to each other in the state where the second filter 13b is located on the upstream side and the first filter 13a is located on the downstream side. In this structure, the filters 13a and 13b are close to each other, and the components which are released from the physical adsorbent 37 are surely adsorbed by the chemical adsorbent 38. It is also possible, as shown in FIG. 11D to locate the first filter 13a on the downstream side of the blower 22, and the second filter 13b on the upstream side of the blower 22, contrary to the structure shown in FIG. 11A. In this case, the chemical adsorbent 38 is located at the upper position than the physical adsorbent 37. Even if the physical adsorbent 37 releases the components which it once adsorbed when the air-conditioner 12 is non-operated, the components move upward and stays in the vicinity of the filter 13b, and are easily adsorbed by the chemical adsorbent 38 in the filter 13b. As described above, the physical adsorbent 37 and the chemical adsorbent 38 are not necessarily located at positions close to each other, but may be located at any positions as far as the chemical adsorbent 38 can adsorb the components which are released by the physical adsorbent 37.

As described above, when the composition for use in adsorption treatment of the present invention is used in a filter for air-cleaning, it is preferable that the composition is interposed between permeable materials (filter materials) such as non-woven cloth and electrostatic paper to form the filter. When the composition is used for treating gases such as exhaust gas from cars, smoke from cigarettes, and gas from oil heaters, it is preferable that the composition is used together with a physical adsorbent such as an active charcoal. In this case, the mixture of the composition and an active charcoal may be interposed between the permeable materials such as non-woven cloth and electrostatic paper. Alternatively, two kinds of filters may be employed: one filter contains an activated charcoal interposed between permeable materials; and the other filter contains the composition of the present invention interposed between permeable materials.

As described above, the composition for use in adsorption treatment of the present invention is used in an adsorption treatment device and a filter for air-cleaning through which the gas to be treated is forcibly passed. Alternatively, the composition also can be used in building materials, wall paper, and ornaments. In these applications, the composition is naturally in contact with the gas and adsorbs the components therefrom.

The composition of the present invention requires moisture when it reacts with the components to be adsorbed, and adsorbs them from the gas to be treated. There is no need, however, to supply water to the composition. The composition of the present invention is prepared by blending the binder, the water-absorbing substance, and the adsorbing substance at the optimum weight ratio, and thus-prepared composition has a mechanism in which the water-absorbing substance absorbs moisture (i.e. water) in the air, and supplies the moisture to the adsorbing substance. The reaction between the adsorbing substance and the components to be adsorbed satisfactorily proceeds with the moisture supplied from the water-absorbing substance, thereby achieving excellent adsorption. Exceptionally, when the composition is used in a very dry environment, in order to assure good adsorption, a humidifier may be used so that sufficient moisture is supplied to the composition together with the gas to be treated.

The present invention provides a composition for use in adsorption treatment capable of adsorbing components to be adsorbed with high efficiency in a simple manner, and a method for adsorbing the components using the composition. Through the use of the composition, an adsorption treatment device and a filter become compact in size and can adsorb components to be adsorbed with high efficiency.

EXAMPLES

Hereinafter, the present invention will be further described by way of examples.

First, in the following Examples 1 to 3, the test for examining the ability of adsorbing acetaldehyde of the adsorbent was conducted.

Example 1

Figure 12:
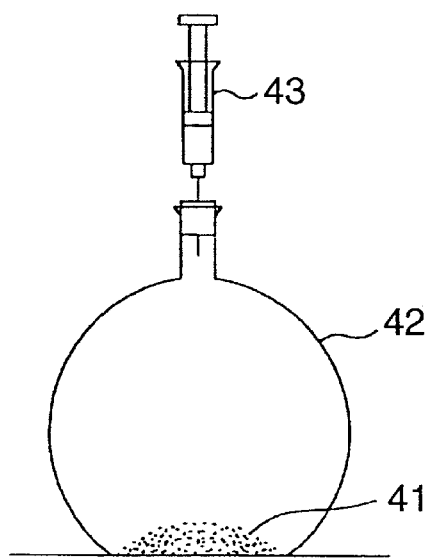
FIG. 12 is a schematic diagram showing a tool used for executing tests of Examples 1 to 4.

In the test, adsorbents A to D were prepared by the following methods respectively, and the test was conducted for the respective adsorbents A to D as an adsorbent 41. As shown in FIG. 12, the adsorbent 41 was put into a flask 42 of 1000 cc in volume. Into the flask, acetaldehyde was injected with a syringe so that the acetaldehyde concentration inside the flask became 1000 ppm, and the flask was hermetically sealed. The flask was left for 1 hour at the room temperature(between 20 to 30° C.), and after that, the rates of removing acetaldehyde of the respective adsorbents A to D were measured.

Preparation of Adsorbent

Adsorbent A: 1 g of Eugenol as an adsorbing substance, and 10 g of silica gel (an average particle diameter: 0.05 to 0.2 mm) as a water-absorbing substance were mixed with each other and crushed together to prepare an adsorbent A in the form of powder having an average particle diameter of 5 to 50 $\mu$m.

Adsorbent B: 1 g of 3,5-xylenol as an adsorbing substance, and 10 g of silica gel of the same type as that used for preparing the adsorbent A were mixed with each other and crushed together to prepare an adsorbent B in the form of powder having an average particle diameter of 5 to 50 μm.

Adsorbent C: 1 g of Resorcin as an adsorbing substance, and 10 g of silica gel of the same type as that used for preparing the adsorbent A were mixed with each other and crushed together to prepare an adsorbent C in the form of powder having an average particle diameter of 5 to 50 μm.

Adsorbent D: 1 g of pyrogallol as an adsorbing substance, and 10 g of silica gel of the same type as that used for preparing the adsorbent A were mixed with each other and crushed together to prepare an adsorbent D in the form of powder having an average particle diameter of 5 to 50 μm.

The rates of removing acetaldehyde of the respective adsorbents A to D (weight percent) are shown in Table 1. As seen in Table 1, all the adsorbents A to D showed an excellent adsorption for acetaldehyde.

TABLE 1

|  | Adsorbing substance | Water-absorbing substance | Rate of removal (weight %) |
| --- | --- | --- | --- |
| Adsorbent A | Eugenol | Silica gel | 89 |
| Adsorbent B | 3,5-xylenol | Silica gel | 82 |
| Adsorbent C | Resorcin | Silica gel | 80 |
| Adsorbent D | Pyrogallol | Silica gel | 84 |

Example 2

Adsorbents E to H were prepared using resorcin as an adsorbing substance, substance as was the case of preparing the adsorbent C in Example 1. The rates of removing acetaldehyde of the respective adsorbents E to H were measured by using the same steps of Example 1.

Preparation of Adsorbent

Adsorbent E: 1 g of resorcin, 0.2 g of oxalic acid, and 10 g of silica gel of the same type as that used in Example 1 were mixed with each other and crushed together to prepare an adsorbent E in the form of powder having an average particle diameter of 5 to 50 μm.

Adsorbent F: 1 g of resorcin, 0.2 g of sodium carbonate, and 10 g of silica gel of the same type of that used in Example 1 were mixed with each other and crushed together. The mixture was formed into tablets to prepare an adsorbent F in the form of tablets having the same size with each other.

Adsorbent G: 1 g of resorcin, and 10 g of H- and ZSM5-type zeolite (silica-alumina ratio: $SiO_2/Al_2O_3$ (molar ratio)=80, an average grain diameter of 5 to 10 m) were mixed with each other and stirred together. The mixture was formed into tablets to prepare an adsorbent G in the form of tablets having the same size with each other.

Adsorbent H: 1 g of resorcin, and 10 g of Na-type zeolite (an average particle diameter of 5 to 10 μm) were mixed with each other and stirred together. The mixture was formed into tablets to prepare an adsorbent H in the form of tablets having the same size with each other.

Table 2 shows the rates of removing acetaldehyde of the respective adsorbents E to H (the test result for the adsorbent C is also shown in Table 2). As seen in Table 2, the adsorbents containing a small amount of weak acidic substance or weak basic substance together with resorcin had increased ability of adsorbing acetaldehyde, and in particular, the adsorbents containing a weak acidic substance showed remarkably strong adsorption of acetaldehyde.

However, there is a fear that the weak acidic substance and the weak basic substance cause a problem of deterioration by acid or alkaline when the water-absorbing substance in the adsorbent absorbs moisture in the air. This problem can be avoided by using H-type zeolite or Na-type zeolite as a water-absorbing substance instead of the weak acidic substance and the weak basic substance. Through the use of H-type zeolite and Na-type zeolite, strong adsorption of acetaldehyde can be achieved without the need for the weak acidic substance and the weak basic substance.

TABLE 2

|  | Adsorbing substance | Water-absorbing substance | Rate of removal (weight %) |
| --- | --- | --- | --- |
| Adsorbent C | Resorcin | Silica gel | 80 |
| Adsorbent E | Resorcin + oxalic acid | Silica gel | 98 |
| Adsorbent F | Resorcin + sodium carbonate | Silica gel | 89 |
| Adsorbent G | Resorcin | H-type zeolite | 99 |
| Adsorbent H | Resorcin | Na-type zeolite | 88 |

Example 3

As polyhydric phenol, 1 g of catechol, purpurin, naringin, and rutin were prepared respectively. Each of them was mixed with 10 g of H- and ZSM5A-type zeolite (as was used for preparing the adsorbent G) and stirred together. The respective mixtures were formed into tablets to prepare adsorbents I to L in the form of tablets having the same size with each other. Repeating the steps of Example 1, the rates of removing acetaldehyde were measured for the adsorbents I to L.

Table 3 shows the rates of removing acetaldehyde of adsorbents I to L. As seen in Table 3, all the adsorbents I to L showed strong adsorption of acetaldehyde.

TABLE 3

|  | Adsorbing substance | Water-absorbing substance | Rate of removal (weight %) |
| --- | --- | --- | --- |
| Adsorbent I | Catechol | H-type zeolite | 80 |
| Adsorbent J | Purpurin | H-type zeolite | 77 |
| Adsorbent K | Naringin | H-type zeolite | 80 |
| Adsorbent L | Rutin | H-type zeolite | 82 |

Example 4

Next, the influence of the amount of binder added in the formation of adsorbent on its adsorption activity was examined. Adsorbents M to Q in the form of grains were prepared using 1 g of resorcin and 10 g of H-and ZSM5-type zeolite (as was used for preparing the adsorbent G), and polyvinyl alcohol as a binder. The amount of polyvinyl alcohol was changed for the respective adsorbents M to Q. That is, the weight of binder with respect to the weight of zeolite was: 1.7 percent for the adsorbent M; 2 percent for the adsorbent N; 2.5 percent for the adsorbent O; 3 percent for the adsorbent P; and 5 percent for the adsorbent Q. Repeating the steps of Example 1, the rates of removing acetaldehyde for the respective adsorbents M to Q were measured, except that the measurement was conducted every 5 minutes and was finished when 30 minutes passed.

Figure 13:
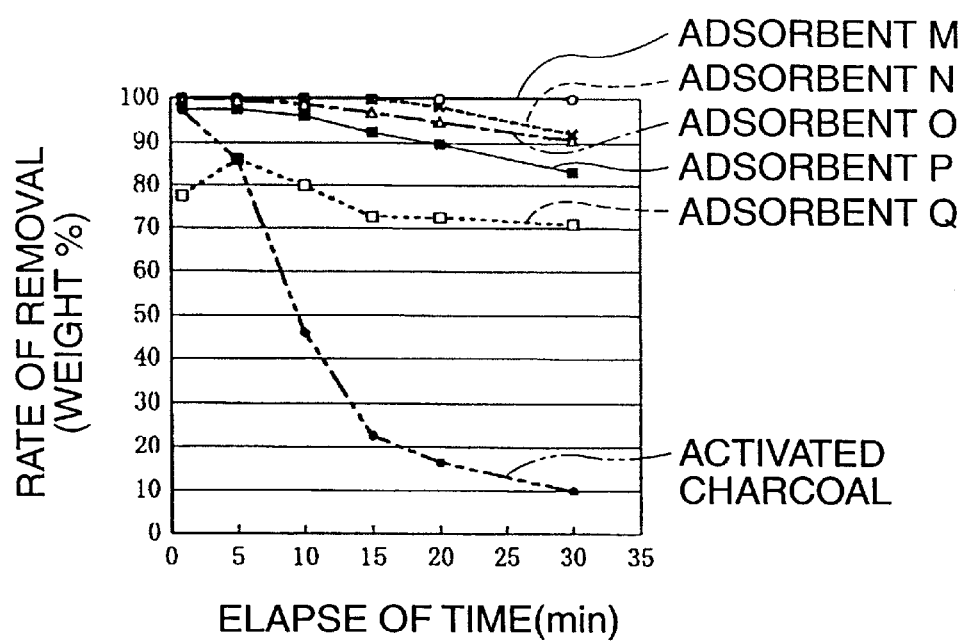
FIG. 13 is a graph showing the results of the test of Example 4.

FIG. 13 shows the results of the test (for comparison, FIG. 13 also shows the result of the case where an activated charcoal was used as an adsorbent). As seen in FIG. 13, as the amount of polyvinyl alcohol increased, the adsorption ability of the adsorbent lowered with the elapse of time. From this result, it is preferable to use smaller amount of polyvinyl alcohol, in order to attain strong adsorption. In particular, acetaldehyde was almost completely removed when the weight of the polyvinyl alcohol was 3 percent or less with respect to the weight of zeolite. However, even if the weight of polyvinyl alcohol was 5 percent with respect to the weight of zeolite, the deterioration of the adsorption ability with the elapse of time was much smaller than the case of using an activated charcoal.

Example 5

Three kinds of adsorbents were prepared by the following methods, through the use of the same materials at the same weight ratio as those employed for preparing the adsorbent P (that is, by using 3 weight percent of polyvinyl alcohol with respect to zeolite).

(i) Resorcin and polyvinyl alcohol were mixed with each other, and the mixture was dissolved into water to prepare an aqueous solution. The aqueous solution was pored to zeolite in the form of powder while being stirred with a stirrer. As a result, the adsorbent in the form of grains was obtained.

(ii) Polyvinyl alcohol was dissolved into water to prepare an aqueous solution. The aqueous solution was pored to zeolite in the form of powder while being stirred with a stirrer. As a result, the particles of zeolite were attached to each other to form grains. The zeolite in the form of grains was soaked into an aqueous solution of resorcin to allow the zeolite to carry the resorcin. As a result an adsorbent was obtained.

(iii) Resorcin and zeolite in the form of powder were mixed with each other, and while stirring the mixture with a stirrer, an aqueous solution of polyvinyl alcohol was pored thereto. As a result, the adsorbent in the form of grains was obtained.

Then, 0.2 g of the respective adsorbents prepared by the methods (i) to (iii) were put into a thin glass tube. An air containing acetaldehyde of 10 ppm in concentration was flowed into the glass tubes from the upstream to downstream sides at a flow rate of 0.6 m/s. The concentration of the acetaldehyde was measured with elapse of time on the downstream side to measure the rate of removing acetaldehyde.

Figure 14:
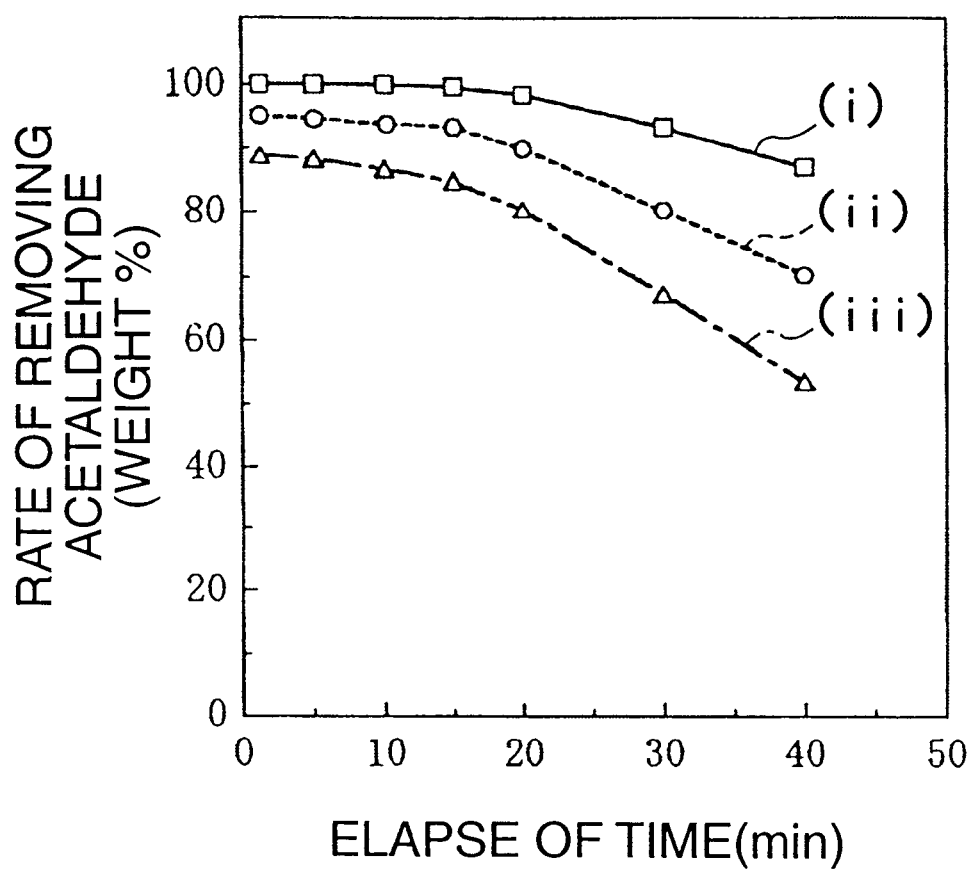
FIG. 14 is a graph showing the results of the test of Example 5.

FIG. 14 shows the results of the test. As seen in FIG. 14, the adsorbent prepared by the method (i) in which resorcin and polyvinyl alcohol were mixed with each other, and then the mixture was mixed with zeilite, had the highest ability of adsorbing acetaldehyde. The adsorbent prepared by the method (ii) in which zeolite and polyvinyl alcohol were mixed with each other to prepare grains of zeolite, the zeolite in the form of grains was mixed with resorcin, had better actaldehyde adsorption ability than the adsorbent prepared by the method (iii) in which resorcin and zeolite were mixed with each other, and the mixture was mixed with polyvinyl alcohol. The reason of these results is considered that, in the methods (i) and (ii), almost all the particles of resorcin used as an adsorbing substance for adsorbing acetaldehyde can be prevented from being coated with polyvinyl alcohol.

According to the method for producing the adsorbent of the present invention, the adsorbing substance is mixed with the binder, and the mixture is mixed with the water-absorbing substance to prepare the adsorbent in the form of grains. Alternatively, the water-absorbing substance is mixed with the binder so that the particles of the water-absorbing substance are attached to each other to form grains, and the water-absorbing substance in the form of grains is mixed with the adsorbing substance to allow the water-absorbing substance to carry the adsorbing substance. Through the employment of the method of the present invention, a large number of the particles of the adsorbing substance can be refrain from being coated with the binder, and its adsorption activity is not impaired by the binder. The adsorbent having this structure has high adsorption ability.

Example 6

Figure 15A:
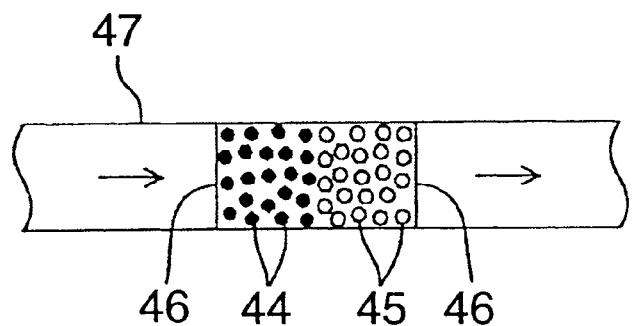
FIGS. 15A–15D are schematic diagrams showing a tool used for executing the test of Example 6.
Figure 15B:
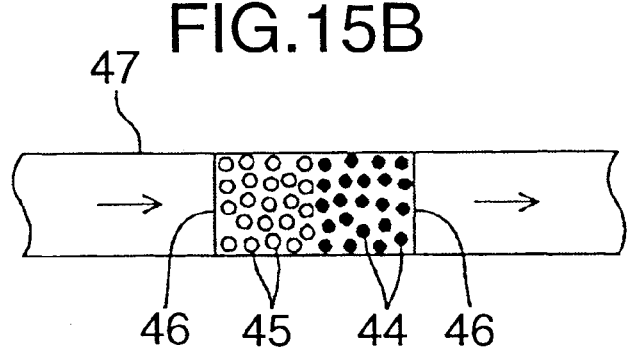
Figure 15C:
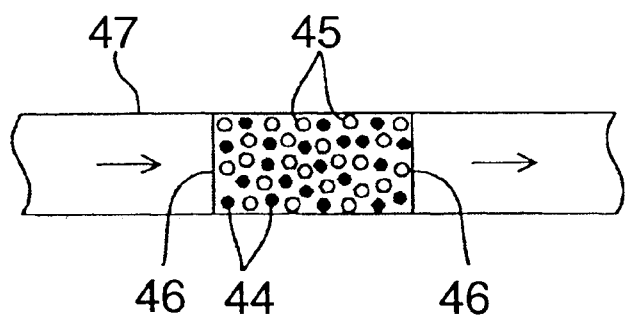
Figure 15D:
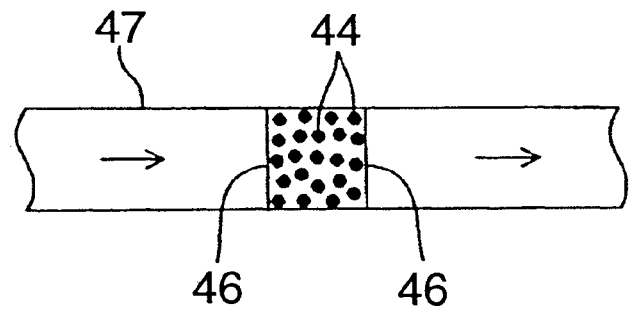
Figure 16:
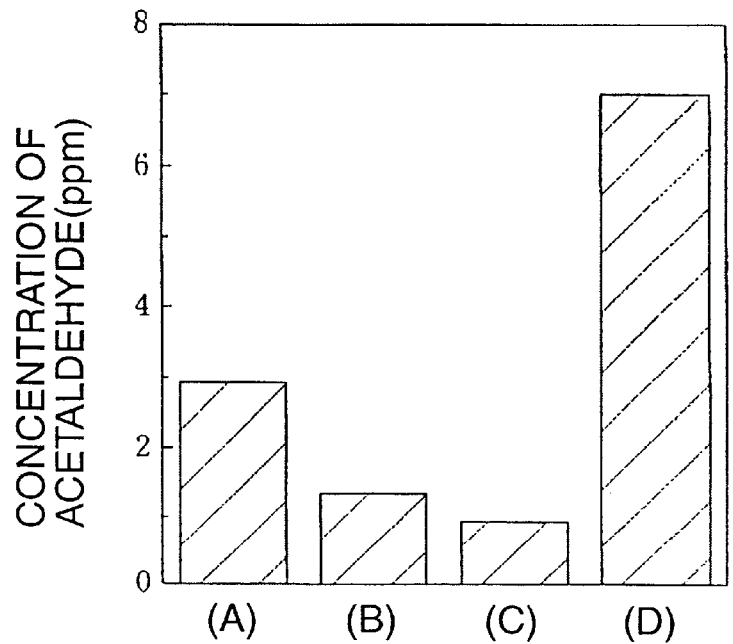
FIG. 16 is a graph showing the results of the test of Example 6.

Next, the effect of using an physical adsorbent 44 and a chemical adsorbent 45 together was examined, as shown in FIGS. 15A to 15D. As the physical adsorbent 44, an activated charcoal was used. As the chemical adsorbent 45, an adsorbent of the same type as the adsorbent G prepared in Example 2 (resorcin+H-and ZSM5-type zeolite) was used. The physical adsorbent 44 (0.1 g) and the chemical adsorbent (0.1 g) were charged into a thin glass tube 47 together. In FIG. 15A, the physical adsorbent 44 was arranged on the upstream side (i.e. on the left side in FIG. 16A), and the chemical adsorbent 45 was arranged on the downstream side (i.e. on the right side in FIG. 15A) in a direction of the flow of acetaldehyde. In FIG. 15B, contrary to the structure of FIG. 15A, the chemical adsorbent 45 was arranged on the upstream side, and the physical adsorbent 44 was arranged on the downstream side. In FIG. 15C, the physical adsorbent 44 and the chemical adsorbent 45 were uniformly mixed with each other, and the mixture was charged in the glass tube. For comparison, as shown in FIG. 15D, only the physical adsorbent 44 (0.1 g) was charged in the glass tube. Both sides of the area of the glass tube where the adsorbents 44 and 45 were charged were sealed with permeable members 46.

Subsequently, an air containing acetaldehyde of 30 ppm in concentration was passed through the glass tubes 47 at a flow rate of 1 L/min for 5 minutes. After that, the glass tubes 47 were respectively put in an air-bag of 1 L in volume, and were left for 20 minutes in the state where the temperature inside the air-bags was kept at 80° C . After 20 minutes, the concentrations of acetaldehyde in the air-bags were measured. The higher the concentration of acetaldehyde was, the larger the amount of acetaldehyde which the activated charcoal once adsorbed but released again.

FIGS. 16A to D show the result of the test. FIGS. 16A to D respectively correspond to FIGS. 15A to D. As seen in FIGS. 16A to D, when the physical adsorbent and the chemical adsorbent were used together, the concentration of acetaldehyde was lower than the case where only the physical adsorbent was used. This is because the acetaldehyde released from the physical adsorbent was adsorbed by the chemical adsorbent. The test result was poor and the concentration of acetaldehyde was high in the case where the physical adsorbent was charged on the upstream side, as compared with the case where the physical adsorbent was charged on the downstream side. The reason of this is considered as follows. While the air containing acetaldehyde was passed through the glass tubes, the physical adsorbent, located on the upstream position, was exposed to acetaldehyde before the chemical adsorbent did, and adsorbed large amount thereof. However, when the physical adsorbent was subjected to high temperature, it released large amount of acetaldehyde which it had adsorbed once. From this test result, it is impossible to determine which position is better for the physical adsorbent.

Example 7

Next, the effect of placing the physical adsorbent on the upstream side, and the chemical adsorbent on the downstream side was examined. In this test, 0.1 g of the physical adsorbent and 0.1 g of the chemical adsorbent of the same types as those used in Example 6 were respectively charged into a glass tube, as was conducted in Example 6. An air containing acetaldehyde of 10 ppm in concentration was passed through the glass tubes from the upstream side at a flow rate of 0.6 m/s, and the concentration of the acetaldehyde was measured on the downstream side with the elapse of time to examine the rate of removing acetaldehyde. In this test, the physical adsorbent and the chemical adsorbent were charged in the glass tube in the following four manners.

(i) the physical adsorbent was arranged on the upstream side, and the chemical adsorbent was arranged on the downstream side in the glass tube (as was the case shown in FIG. 15A).

(ii) the chemical adsorbent was arranged on the upstream side, and the physical adsorbent was arranged on the downstream side in the glass tube (as was the case shown in FIG. 15B).

(iii) the physical adsorbent and the chemical adsorbent were mixed uniformly with each other, and the mixture was charged in the glass tube (as was the case shown in FIG. 15C).

(iv) only the chemical adsorbent was charged in the glass tube (as was the case shown in FIG. 15D, except for using the chemical adsorbent instead of the physical adsorbent).

Figure 17:
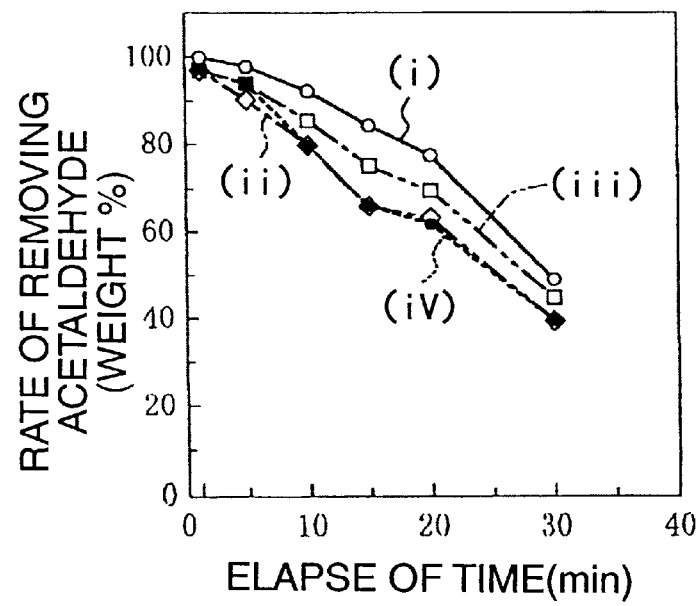
FIG. 17 is a graph showing the results of the test of Example 7.

FIG. 17 shows the results of the test. As seen in FIG. 17, when the physical adsorbent was arranged on the upstream side, the rate of removing acetaldehyde was higher than other cases. The reason of this is considered that the acetaldehyde released by the physical adsorbent was sent to the downstream side where the chemical adsorbent adsorbed the acetaldehyde.

Example 8

The rate of removing acetaldehyde was examined by repeating the steps of Example 7, except that the test was conducted only for the case where the physical adsorbent was arranged on the upstream side and the chemical adsorbent on the downstream side, and the amount of the physical adsorbent was changed to (v) 0.5 g, (vi) 0.2 g, and (vii) 0.05 g.

Figure 18:
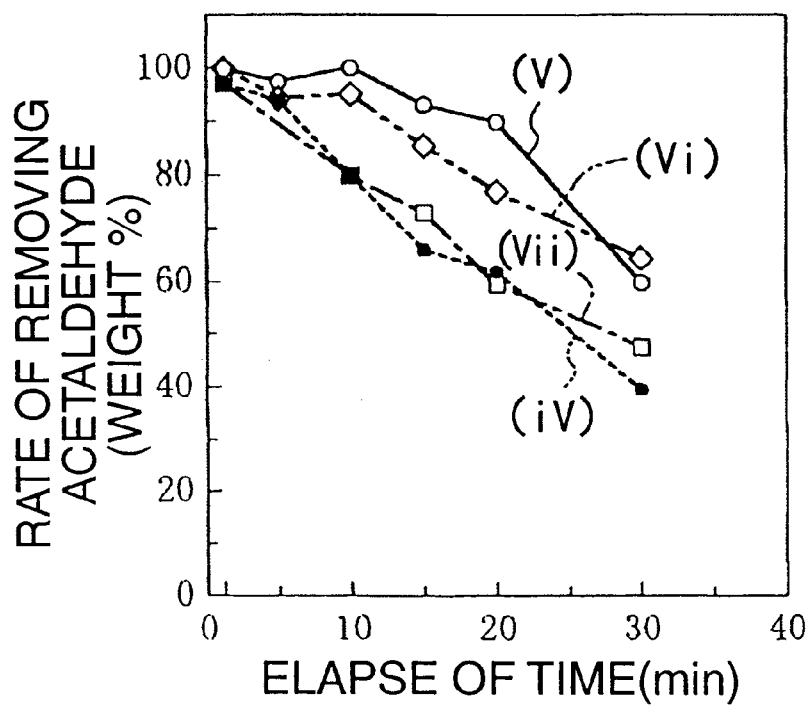
FIG. 18 is a graph showing the results of the test of Example 8.

FIG. 18 shows the results of the test (for comparison, the test result obtained form the case (iv) of FIG. 7 is also shown). As seen in FIG. 18, the larger the amount of physical adsorbent, the higher the rate of removing acetaldehyde becomes.

Hereinafter, the applications of the adsorbent of the present invention to various products and products will be described referring to drawings.

Figure 19:
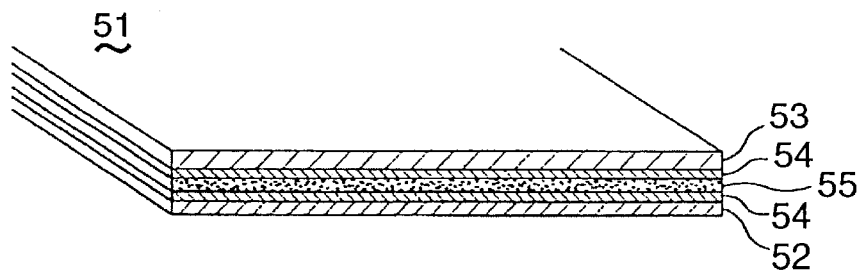
FIG. 19 is a perspective cross-sectional view showing a member used in an air-cleaner according to an embodiment of the present invention.

FIG. 19 is a diagram showing a member 51 for use in cleaning the air in a room. The air-cleaning member 51 is in the form of sheet, and is provided over the substantially entire surface of the ceiling inside a car to adsorb the components to be adsorbed in the air in the room. The lower surface of the air-cleaning member 51 facing the room is constituted by a permeable member 52. The permeable member 52 is made of a leather which is commonly used for the ceiling inside a car.

The upper surface of the air-cleaning member 51 is constituted by a base material 53 made of urethane. The upper surface of the urethane base member 53 is attachable to the roof panel.

Figure 20:
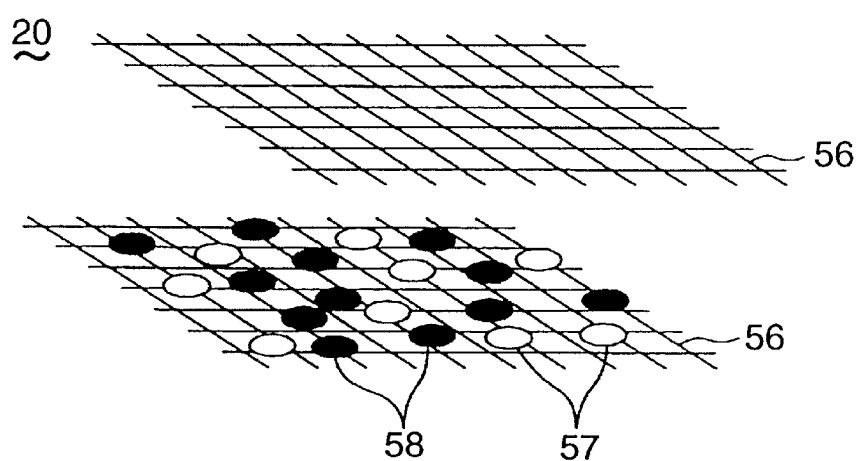
FIG. 20 is a exploded perspective view schematically showing a sheet containing an adsorbent used in an air-cleaner.

Between the permeable member 52 and the base material 53, two glass fiber mats 54 containing an adhesive are interposed, and between the glass fiber mats 54, a sheet 55 containing an adsorbent is interposed. The adsorbent sheet 55 is attached to the permeable member 52 and the base material 53 by the adhesive contained in the glass fiber mats 54. As shown in FIG. 20, the adsorbent sheet includes two mesh materials 56 made of polyethylene fiber. The mesh materials 56 are laminated to each other by a thermal fusion. Between the mesh materials 56, the chemical adsorbent 57 and the physical adsorbent 58 are carried over the entire surface thereof in the state where the adsorbents 57 and 58 are substantially uniformly mixed with each other. The adsorbent sheet 55 is prepared by spreading the chemical adsorbent 57 and the physical adsorbent 13 over the surface of the lower side mesh 56, and the upper side mesh 56 is laminated onto the lower side mesh 56. As a result, the chemical adsorbent 57 and the physical adsorbent 58 are contained in the same meshed space in the state of being substantially uniformly mixed with each other.

As described above, the air-cleaning member 51 in the form of sheet containing the chemical adsorbent 57 and the physical adsorbent 58 is intended for use in the ceiling inside a car. As a result, the ceiling, which is a dead space with a large area, can be effectively utilized. In addition, the air-cleaning member 51 adsorbs various components such as malodor components, and odorless and harmful components which are generated in the car, and move upward and stay in the vicinity of the ceiling. The room temperature in the car easily increases to high, and especially at the ceiling. The physical adsorbent 58, when it is subjected to high temperature, tends to release the components which it once adsorbed. However, the chemical adsorbent 57 adsorbs the components released by the physical adsorbent 58, and the components never flow out of the air-cleaning member 51 into the room, and the adsorbing ability of the air-cleaning member 51. In particular, higher adsorbing ability can be attained by using an adsorbing substance such as resorcin as the chemical adsorbent 57, and H-type zeolite as the physical adsorbent 58. In this combination, almost all the moisture in the air is absorbed by the water-absorbing substance, and therefore, the adsorption activity of the physical adsorbent 58 is never impaired by the moisture in the air. On the other hand, the moisture absorbed by the water-absorbing substance is supplied to the adsorbing compound, and in the presence of the moisture, the adsorbing compound can react with the carbonyl group-containing compounds such as aldehydes, and effectively adsorb and remove them.

In this embodiment, the chemical adsorbent 57 and the physical adsorbent 58 are substantially uniformly mixed with each other. It is also possible that the concentration of the mixture is continuously or discontinuously changed in a direction from the upper surface to the lower surface of the adsorbent sheet 55 in such a manner that the concentration of the chemical adsorbent 57 is higher in the lower area of the adsorbent sheet 55 (at least in the vicinity of the permeable member 52), and the concentration of the physical adsorbent 58 is higher in the upper area of the adsorbent sheet 55. Even if the physical adsorbent 58 releases the components which it has once adsorbed, this structure further effectively prevents the components from getting out of the air-cleaning member 51 through the permeable member 52. Alternatively, the layer of the chemical adsorbent and the layer of the physical adsorbent may be arranged in a direction from the upper surface to the lower surface of the adsorbent sheet 55. In this case, it is preferable that the layer of the chemical adsorbent 57 is below the layer of the physical adsorbent (i.e. on the side of the permeable member 52), in order that the chemical adsorbent 57 surely adsorbs the components released by the physical adsorbent 58 to prevent the components from getting out of the air-cleaning member 51.

In this embodiment, the adsorbent sheet 55 is attached to the permeable member 52 and the base material 53 via the glass mats 54 containing an adhesive. It is also possible that the adsorbent sheet 55 may be directly attached to the permeable member 52 and the base material 53 by fusing the mesh members 56 included in the adsorbent sheet 55, without using the glass fiber mats 54 containing an adhesive.

Figure 21:
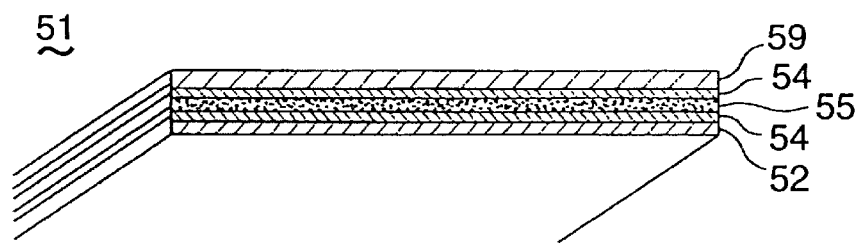
FIG. 21 is a perspective cross-sectional view showing the case where the air-cleaning member is installed to a ceiling of a room in a house and building.

In this embodiment, the air-cleaning member 51 is intended for use in the ceiling inside a car. The air-cleaning member 51 is also applicable to the ceiling of a room in a house and a building. In this case, as shown in FIG. 21, the air-cleaning member 51 is so structured that the adsorbent sheet 55 is attached to the permeable member 52 and a ceiling material 59 by the glass fiber mats 54. By using a material suitable for interior decoration as the permeable member 52, the appearance of the ceiling is not impaired.

Example 9

An air-cleaning member of the same type as the air-cleaning member 51 was produced, except that as the chemical adsorbent 57, an adsorbent of the same type as the adsorbent G prepared in Example 2 (resorcin+H-type zeolite) was used, and as the physical adsorbent 58, an activated charcoal was used. The weight of the chemical adsorbent 57 was 20 percent with respect to the weight of the physical adsorbent, and the adsorbents 57 and 58 were substantially uniformly mixed with each other. The surface area of the permeable member was 300 cm².

The air-cleaning member was installed to the inner upper surface of a vessel of 10 L in volume having a shape of rectangular box. Then, toluene was supplied into the vessel so that the concentration thereof became 10 ppm, and the vessel was hermetically sealed. The vessel was kept at room temperature while the toluene concentration was measured every 10 minutes.

Figure 22:
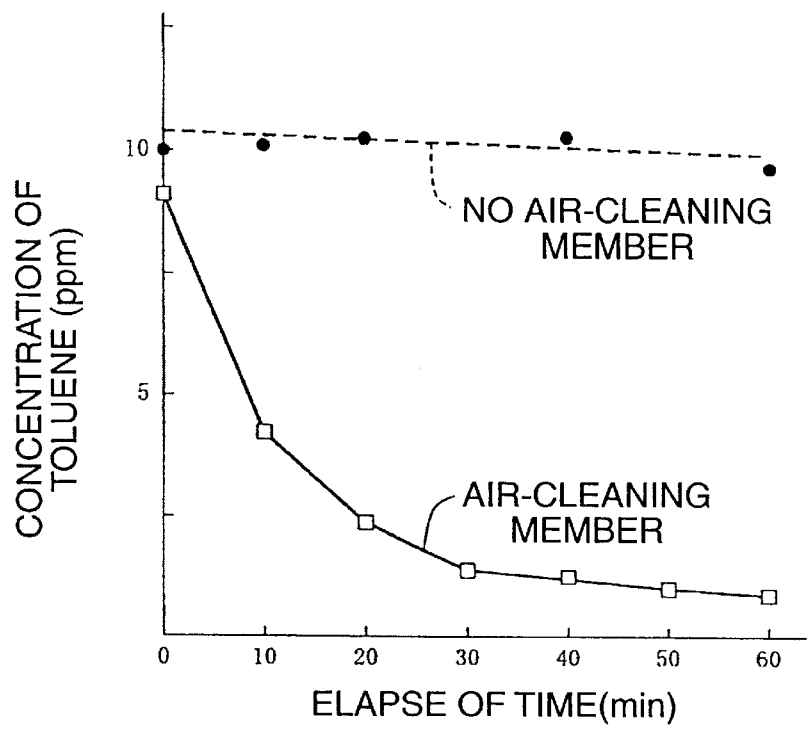
FIG. 22 is a graph showing the results of the test of Example 5.

FIG. 22 shows the results of the test. For comparison, FIG. 22 also shows the test results obtained when no air-cleaning member was installed to the inner upper surface of the vessel. As seen in FIG. 22, in the vessel with the air-cleaning member, about 90 percent of toluene was removed about in one hour. Contrary to this, in the vessel without the air-cleaning member, there was no change in the toluene concentration.

Example 10

Figure 23:
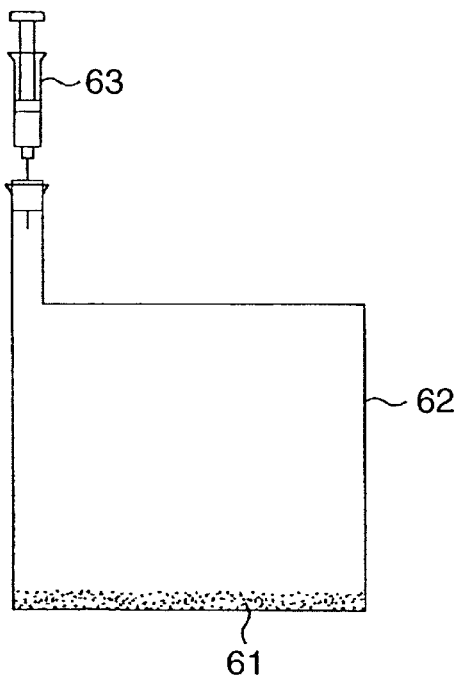
FIG. 23 is a schematic diagram showing a tool used for executing the test of Example 6.

Next, as shown in FIG. 23, a chemical adsorbent 61 was put into a sachet 62 of 3 L in volume, and acetaldehyde was supplied into the sachet 62 so that the concentration thereof became 100 ppm. The chemical adsorbent 61 was of the same type as the adsorbent G prepared in Example 2, and its amount was 1 g in weight. The air in the sachet 62 was suck out of the vessel by a syringe 63 every 10 minutes to take a 3 sample of 2 mL, and the acetaldehyde concentration of the sample was measured to know the acetaldehyde concentration in the sachet 62. The acetaldehyde concentration was measured at room temperature until 30 minutes passed, and after 30 minutes, the air inside the vessel was heated to 80° C. and the acetaldehyde concentration was measured. Subsequently, the same measurement was conducted using an activated charcoal (1 g).

The acetaldehyde concentration was measured by a gas chromatography. Table 4 shows the conditions of the gas chromatography.

TABLE 4

| Column | Glass column was used |
|---|---|
| Filler | Chromosolve 103 |
| Detector | FID |
| Temperature of injection | 180° |
| Temperature of column | 130° C. at initial state, increased 8° C. every 1 minute, and 180° C. at final stage |
| Flow rate of carrier gas | He 40 mL/min |
| Pressure of carrier gas | 4 kg/mL |

Figure 24:
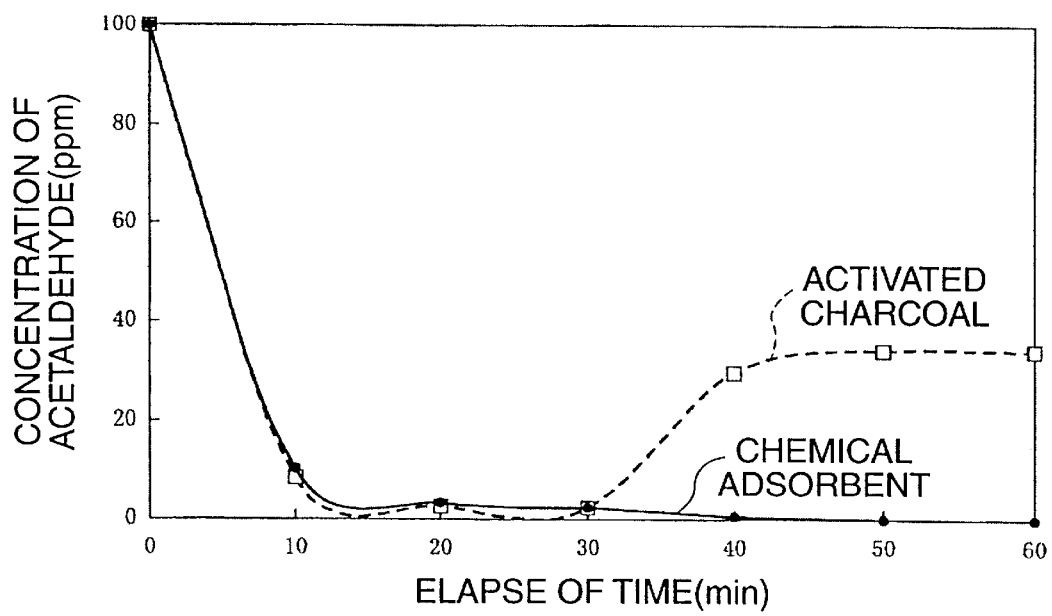
FIG. 24 is a graph showing the results of the test of Example 6.

FIG. 24 shows the results of the test. As seen in FIG. 24, when the temperature was increased to 80° C., acetaldehyde concentration increased. This means that the activated charcoal released the acetaldehyde which it had once adsorbed. Contrary to this, the chemical adsorbent never stopped to adsorb acetaldehyde even when the temperature was increased to 80° C., and after about 1 hour, almost all the acetaldehyde was adsorbed.

Example 11

Figure 25A:
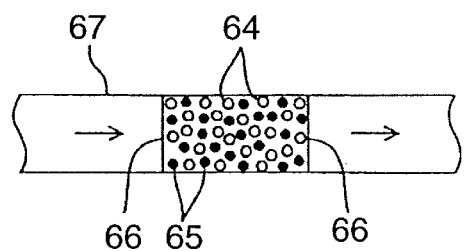
FIGS 25A and 25B are schematic diagrams showing a tool used for executing the test of Example 7.
Figure 25B:
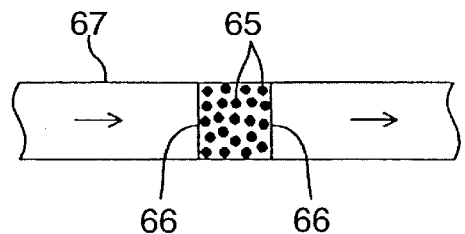

Next, the effect of using the mixture of the chemical adsorbent and the physical adsorbent was examined. As the chemical adsorbent 64, the adsorbent of the same type as the adsorbent G prepared in Example 2 was used. As the physical adsorbent 65, an activated charcoal was used. The chemical adsorbent 64 (0.1 g) and the physical adsorbent 65 (0.1 g) were substantially uniformly mixed with each other, and the mixture was charged into a thin glass tube 67 as shown in FIG. 25A. Both sides of the portion where the mixture of the adsorbents 64 and 65 was charged were sealed by permeable members 66. For comparison, only the physical adsorbent (0.1 g) was charged into another thin glass tube 67 as shown in FIG. 25B.

An air containing acetaldehyde of 30 ppm in concentration was passed through the respective glass tubes at a flow rate of 1 L/min for 5 minutes. After that, the glass tubes 67 were respectively put in an air-bag of 1 L in volume, and were left for 20 minutes in the state where the temperature inside the air-bags was kept at 80° C. When 20 minutes passed, the acetaldehyde concentration in the air-bags was measured. The higher the acetaldehyde concentration, the larger the amount of acetaldehyde which once adsorbed by the activated charcoal but released again.

Figure 26:
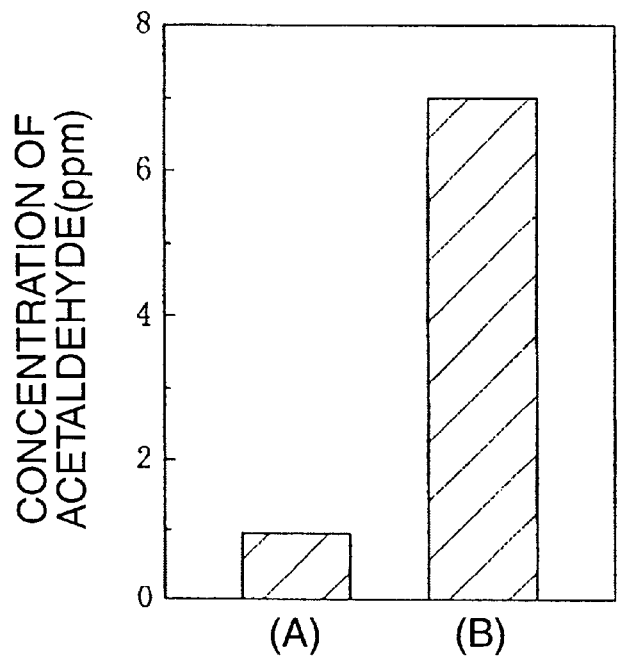
FIG. 26 is a graph showing the results of the test of Example 7.

FIGS. 26A and B show the results of the test. FIGS. 26A and B respectively correspond to FIGS. 25A and B. As seen in FIGS. 26A and B, the acetaldehyde concentration was lower in the case of using the mixture of the chemical adsorbent 64 and the physical adsorbent 65 than the case of using the physical adsorbent 65 alone. This is because the acetaldehyde released from the physical adsorbent 65 was adsorbed by the chemical adsorbent 64.

As described above, the air-cleaning member in the form of sheet for use in the ceiling inside a car and of a room in a house is formed with the chemical adsorbent and the physical adsorbent. Even if the physical adsorbent releases the components which it once adsorbed, the chemical adsorbent adsorbs the components and prevents them from escaping from the air-cleaning member into the room. Thus-structured air-cleaning member is capable of absorbing various components at any temperature with high efficiency.

Besides the air-cleaning member described above, the adsorbent prepared in accordance with the present invention is applicable to the following applications:

combustion apparatuses other than heaters, and various combustion equipment (boilers, combustion treatment apparatuses, incineration apparatuses, gas ranges, gas water heaters for home use;

oil stoves and oil fan heaters; and doors, windows, shutters, interior materials for houses, and tiles.

There are also the following applications as follows: items to wear such as clothes, hats, masks, and footwear; portable items such as bags and carry bags; furnishings for houses and buildings such as tables, desks, business equipment, cabinets, chests, chairs, sofas, beds, bed clothing, lightening fixtures, ventilators, kitchen equipment; household articles such as ornament with deodorizing function, various household appliances, cigarette holders, dust catchers (not only for home use but also for use in offices and factories), ash trays, vacuum cleaners, electric fans, air-cleaners, dehumidifiers, humidifiers, carpets, mats, tatami mats, curtains, blinds, wall paper, paper sliding screens (shoji), paper sliding doors (fusuma), tents, interior goods, articles to be installed to units and paths of ventilation system for houses, and articles to be mounted on range foods located above gas ranges.

The above items are only examples, and the present invention is not limited thereto. On top of the above-described items, the adsorbent of the present invention may be used in combination with insect repellents, paints, adhesives, cements, stone materials, clay materials, and the like.

Example 12

Figure 27:
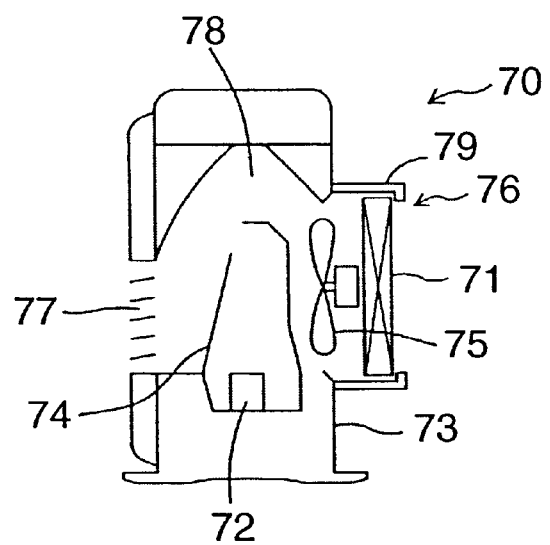
FIG. 27 is a cross-sectional view showing an oil fan heater produced according to Embodiment 1 of the present invention.

FIG. 27 is a cross-sectional view showing an oil-fan heater 70 which is a combustion hot air type heater structured according to the present invention. The oil fan heater 70 includes a casing 73, a combustion chamber (combustion part) 74 incorporated into the central space of the casing 73, and a burner 72 for burning oil and mounted on the center of the bottom surface of the combustion chamber 74. On the back surface of the casing 73, an inlet 76 with a fan 75 is formed, and through the inlet 76, the air is introduced into the oil fan heater 70. On the front surface of the casing 73, an outlet 77 is formed, and through the outlet 77, the air heated in the oil fan heater is released. Between the inlet 76 and the outlet 77, a path 77 for passing the air which is connected to the combustion chamber 74 is formed.

In the inlet 76, four filters 71 for cleaning the air are fitted in the rear of the fan 75. The filters 71 are in the form of sheet, and are arranged in two by two in a row and column, as shown in FIG. 7. Each filter 13 has a corrugated shape seen from the above, as shown in FIG. 8. In addition, each filter 13 is fitted inside a frame 31 made of a resin, and therefore, is supported by the frame 31 so as not to be bent.

The filters 71 are detachably fitted to a filter holder 79 which is provided to the back surface of the casing 73, and are exchangeable if necessary. Although the mechanism of fitting the filters 71 to the filter holder 79 is not specifically shown in drawings, they are fitted to the filter holder 79 by the following methods. In one method, the filters 71 are slid into the filter holder 79 in parallel to the back surface of the casing 73, and are fixed to specific positions inside the holder 79 by butterfly bolts.

In another method, attachment holes are formed in the four corners of the frames 31 of the respective filters 71. A butterfly bolt is put into each hole to firmly fix the filters 71 to the casing 73. The method for fitting the filters 71 is not limited to the above, but any other method may be employed.

When the air in the room is introduced into the oil fan heater 70, the air is passed through the filters 71 from its right side to its left side in FIG. 27, so as to be purified by the filters 71. Then, the air is sent through the path 78 where it is heated by the heat generated in the combustion chamber 74 into a hot air. The hot air is blown into the room.

The filter member 71 of Example 12 contains, as shown in FIG. 10 as an enlarged drawing, a chemical adsorbent 38 and the physical adsorbent 37. As described above, the chemical adsorbent 38 contains a water-absorbing substance, and an adsorbing substance which is phenol compounds having high ability of adsorbing carbonyl group-containing compound. The chemical adsorbent may also contain a compound having high ability of adsorbing ammonia, hydrogen chloride, and hydrogen sulfide, together with the phenol compounds and the water-absorbing substance. Examples of compounds preferable for adsorbing ammonia include acidic deodorants such as fumaric acid, and complex formation type deodorants such as betaine (amphoteric)compounds, and anico (ferrous compounds). Examples of compounds preferable for adsorbing hydrogen chloride and hydrogen sulfide include basic deodorants such as sodium carbonate and amine compounds, carboxylic metal salt, and betaine (amphoteric) compounds. Ammonia, hydrogen chloride, and hydrogen sulfide are components which an activated charcoal tends to release as well as aldehydes at high temperature, even if these components are once adsorbed by the activated charcoal. When an activated charcoal is used as the physical adsorbent 37, it is preferable to use the activated charcoal together with the chemical adsorbent 38.

Example 13 (Modification of Example 12)

In Example 12, the filters 71 containing the physical adsorbent 37 and the chemical adsorbent 38 are placed on the upstream side of the fan 75 in the inlet 76. Alternatively, the filters 71 may be placed on the downstream side of the fan 75 in the inlet 76 (that is, between the fan 75 and the combustion chamber 74).

The filters 71 may be constituted with two filters: a first filter containing the physical adsorbent 37 alone; and a second filter containing the chemical adsorbent 38 alone. The first and second filters may be combined into one piece unit, or may be used as separate pieces and either one of them is placed on the upstream side and the other on the downstream side. In either case, it is preferable that the physical adsorbent 37 is placed on the upstream side, and the chemical adsorbent 38 is placed on the downstream side. In this manner, even if the physical adsorbent 37 releases the components which it once adsorbed, the chemical adsorbent 38 adsorbs them. For example, the components released by the physical adsorbent 37 are completely adsorbed by the chemical adsorbent 38 by combining the first filter and the second filter into one piece unit. However, the arrangements of the adsorbents 37 and 38 are not limited to the above, but any other arrangements may be employed as far as the chemical adsorbents 38 adsorbs the components released by the physical adsorbent 37.

It is also possible that the filters 71 placed in the inlet 76 do not contain the adsorbents 37 and 38, but have a function of removing dust alone. In this case, the adsorbents 37 and 38 are placed in the path 78 or at any arbitrary position in the vicinity of the path 78. However, taking into consideration that the physical adsorbent 37 tends to release the adsorbed components at high temperature, and the chemical adsorbent 38 is adversely affected by heat, it is preferable that the adsorbent 37 and 38 are contained in the filters 71 and are placed on the upstream side of the burning chamber 74 in the inlet 26.

It is also possible that the filters may contain the chemical adsorbent 38 alone.

Example 14

In Example 14, a cigarette as a product formed with a burning portion and an adsorbent will be described. FIGS. 28 to 30 are drawings respectively showing the cigarette produced according to the present invention. In FIGS. 28 to 30, the paper for wrapping tobacco leaves is not shown, and an adsorbent 84 is charged into different positions of the filter from each other.

Figure 28A:
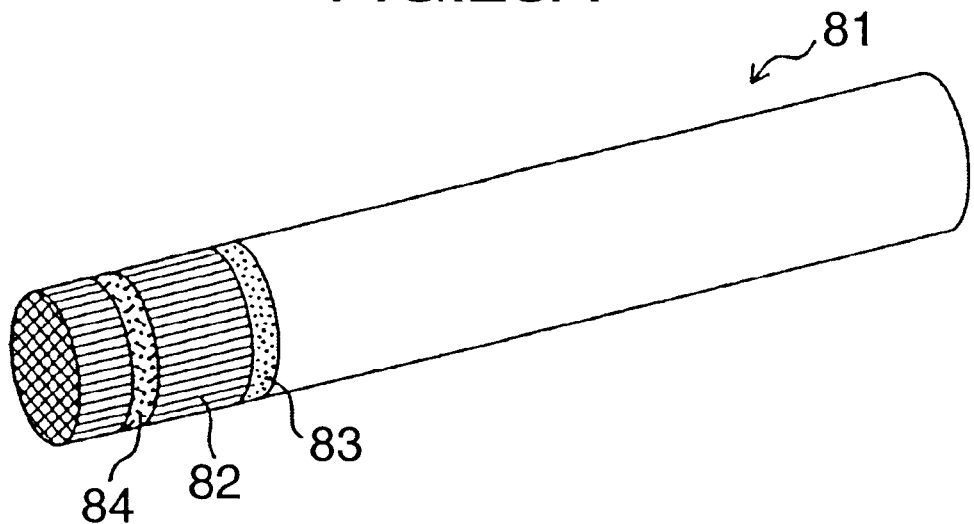
FIGS. 28A–28C are perspective views showing a cigarette produced according to Embodiment 2 of the present invention.
Figure 28B:
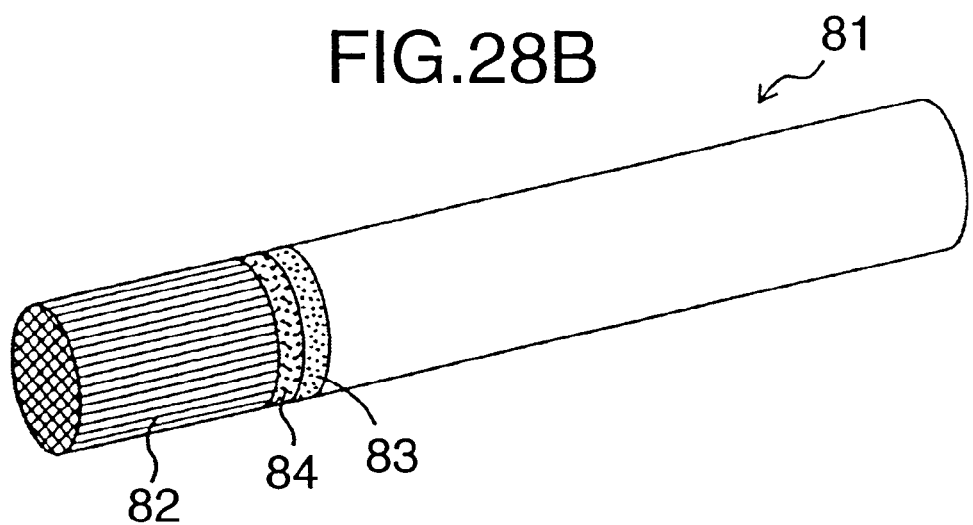
Figure 28C:
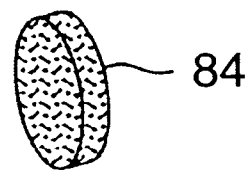

A cigarette 81 shown in FIG. 28A has a filter 82 in the form of sponge, and an activated charcoal 83 is charged in one end of the filter 82 so that it is interposed between the filter 82 and the tobacco leaves. An adsorbent 84 containing the chemical adsorbent 38 of the same type as that described in Example 12 is charged at a middle portion of the filter 82. In a cigarette 81 shown in FIG. 28B, the adsorbent 84 is charged in one end of the filter 82 on the tobacco leave side, and immediately next to the adsorbent 84, the activated charcoal 83 is charged so that the adsorbent 84 and the activated charcoal 83 are interposed in this order between the filter 82 and the tobacco leaves. The adsorbent 84 is formed into the shape of tablet having permeability, or is charged into a permeable sheet having a discoid shape with the same diameter as -that of the cigarette 81, as shown in FIG. 28C. If the adsorbent 84 having a shape shown in FIG. 28C is prepared prior to the production of cigarettes, the productivity of cigarettes 81 is never lowered.

Figure 29A:
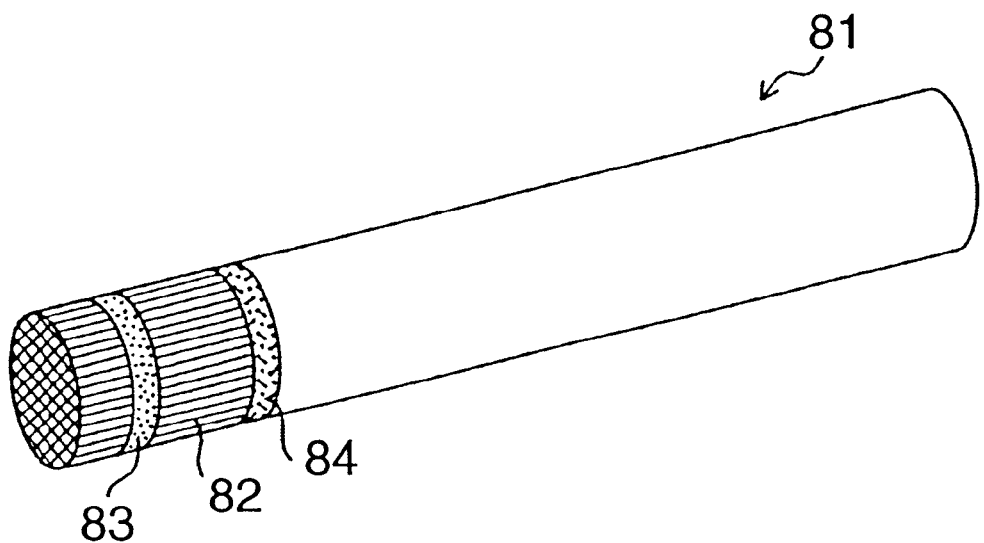
FIGS. 29A and 29B are perspective views showing a modification of the cigarette of FIG. 28.
Figure 29B:
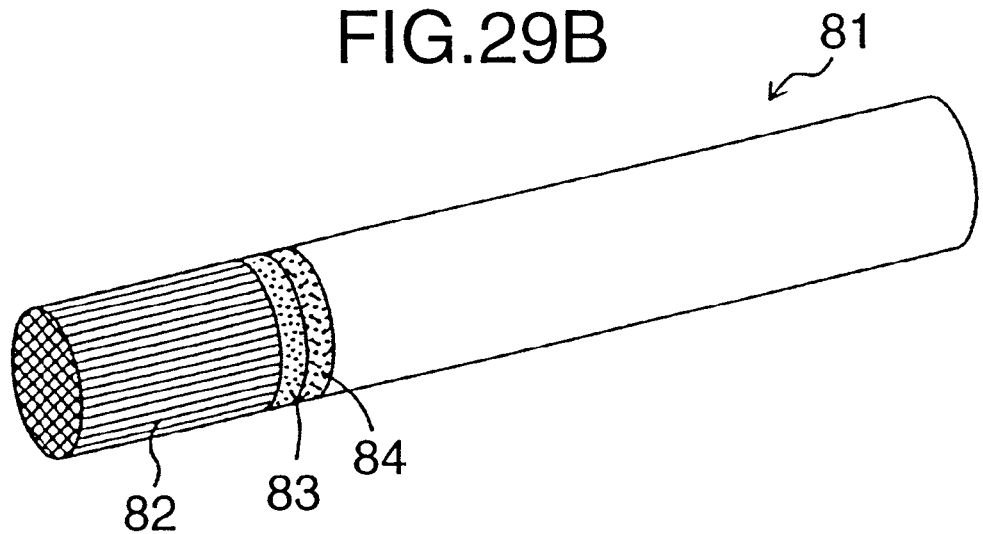

In the cigarette 81 shown in FIG. 29A, contrary to the structure of FIG. 28A, the activated charcoal 83 is charged in the middle of the filter 82, and the adsorbent 84 is arranged in one end of the filter 82 on the tobacco leave side so that it is interposed between the filter 82 and the tobacco leaves. In the cigarette 81 shown in FIG. 29B, contrary to the structure of FIG. 28A, the activated charcoal 83 is charged in one end of the filter 82 on the tobacco leave side, and immediately next to the activated charcoal 83, the adsorbent 84 is arranged so that the activated charcoal 83 and the adsorbent 84 are interposed in this order between the filter 82 and the tobacco leaves.

Figure 30A:
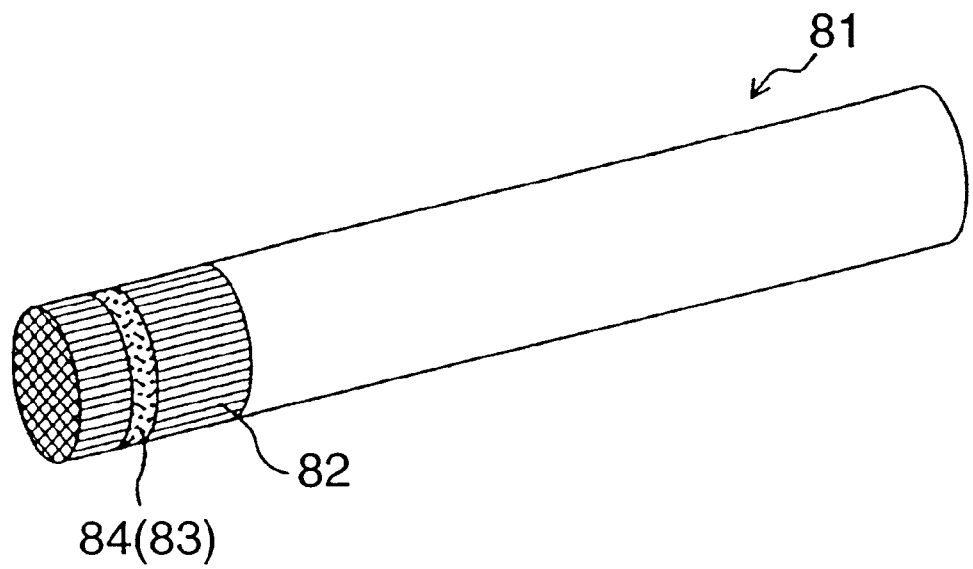
FIGS. 30A and 30B are perspective views showing another modification of the cigarette of FIG. 28.
Figure 30B:
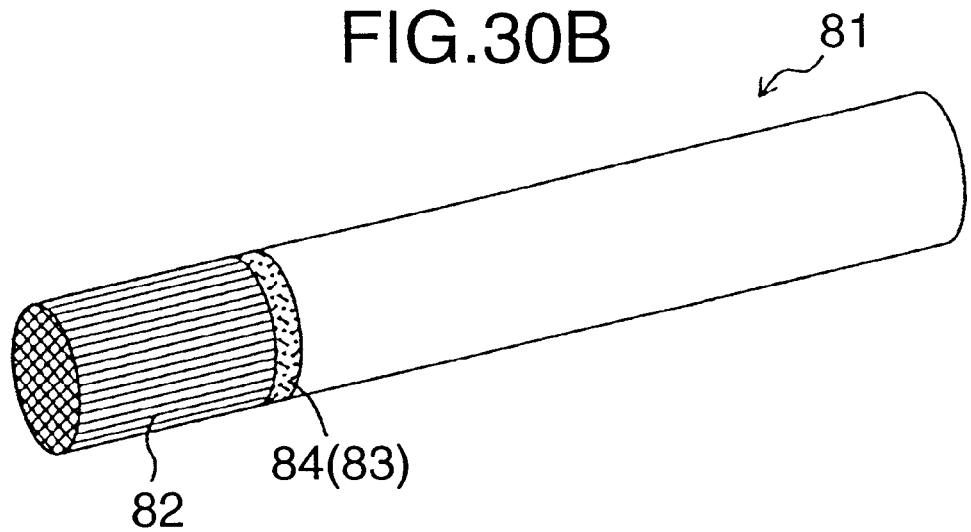

In the cigarette shown in FIG. 30A, the adsorbent 84 contains both the chemical adsorbent 38 and the activated charcoal 83, and is charged in the middle of the filter 82. In the cigarette 81 shown in FIG. 30B, the adsorbent 84 containing both the chemical adsorbent 38 and the physical adsorbent 83 is charged on one end of the filter 82 on the tobacco leave side so that it is interposed between the filter 82 and the tobacco leaves.

The tobacco 81 provided with the adsorbent 84 has an advantage that, when the smoke passes through the adsorbent 84, aldehydes are effectively removed by the adsorbent 84 from the smoke, thereby preventing the problems of odors and corrosions in a room. The mechanism of the adsorption by the adsorbent 84 is the same as that described in Example 12, and therefore, the description thereof is omitted.

In the above description, the adsorbents 84 and the activated charcoal 83 are arranged in various positions, as shown in FIGS. 28 to 30. However, in order to allow the chemical adsorbent 38 to adsorb the aldehydes which are adsorbed by the activated charcoal 83 but released therefrom again, preferable is the structure shown in FIGS. 28A and B in which the activated charcoal 83 is charged on the upstream side, and the chemical adsorbent 38 is charged on the downstream side, or the structure shown in FIGS. 30A and B in which the chemical adsorbent 38 and the activated charcoal 83 are mixed with each other. However, a cigarette generates a large amount of aldehydes, and therefore, there is no problem if the chemical adsorbent 38 is charged on the upstream side, and the activated charcoal 83 is charged on the downstream side.

Example 15

In Example 14, a building material 91 formed with the adsorbent of the present invention will be described. The building material 91 shown in FIG. 31 has a five-layered structure including a base material 92, a glass fiber mat 93, an adsorbent sheet 94, a glass fiber mat 93, and a permeable member 95 arranged in this order from top to bottom in FIG. 31. The building material 91 is used for a ceiling of a room, for example. The bottom surface of the building material (that is, the permeable member) faces the room. The base material 92 is a plate prepared by hardening wood chips with an adhesive, or a plywood prepared by laminating thin panels with each other.

The adsorbent sheet 94 contains the physical adsorbent 37 and the chemical adsorbent 38 in the form of powder which are of the same types as those described in Example 12. Specifically, the adsorbent sheet 94 is prepared by attaching two permeable sheets such as non-woven cloths to each other, and putting the mixture of the adsorbents 37 and 38 into the space between the sheets. Alternatively, the adsorbent sheet 94 contains only the chemical adsorbent 38. The glass fiber mats 93 are used as reinforcement materials. The permeable member 95 is a decorative laminate made of a permeable material.

By attaching the building material 91 to the ceiling of a room in a house and building, the adsorbent sheet 94 adsorbs the aldehydes released from the adhesive used in the base material 92. Therefore, the aldehydes is never allowed to escape from the building material 91 into the room. When a combustion heater is used or someone smokes in the room and aldehydes are generated, the aldehydes, upon contact with the adsorbent sheet 94 through the permeable member 95 and the glass fiber mats 93, are adsorbed by the adsorbent sheet 94. Through the use of the building material 91, the acetaldehyde concentration in the room never becomes high.

Example 16 (modification of Example 15)

Figure 32:
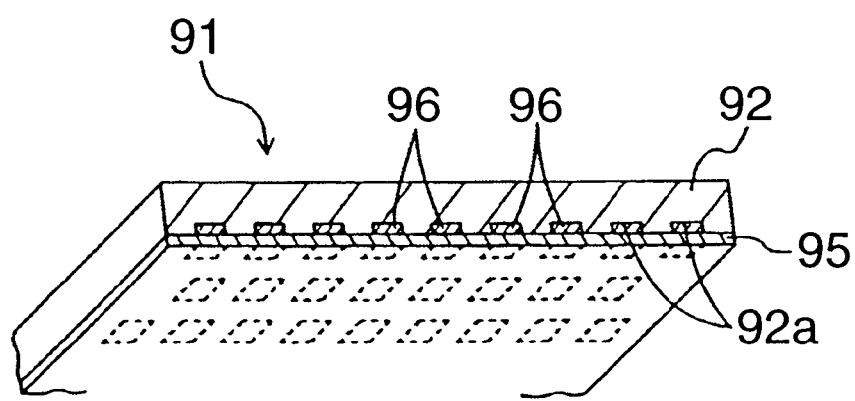
FIG. 32 is a perspective view showing a modification of the building material of FIG. 31.

FIG. 32 shows another type of building material 91 which is a modification of the building material 91 of Example 15. In the building material 91 of Example 16, a plurality of recesses 92a are formed on one side of the base material 92 (on the bottom surface of the base material). In each recess 92a, an adsorbent 92 in the form of grain is charged. The bottom surface of the base material 92 is covered with a permeable member 95 so that the recesses 92a are closed. The base material 92 is a plate prepared by hardening wood chips with an adhesive, or a plywood prepared by laminating thin panels with each other, and the permeable member 95 is a decorative laminate made of a permeable material, as is the case of Example 15.

The permeable member 95 may be formed with a plurality of pores (not shown) for permeability. In this case, each pore is required to have a diameter smaller than the grains of the adsorbent 96 to prevent the grains from dropping out through the pores. This problem can be prevented by forming the adsorbent 96 into a solid form prior to producing the building material 91 as is conducted in Example 14, and by stuffing the adsorbent 96 in a solid form into each recess 92a.

In Example 16, the aldehydes released from the adhesive contained in the base material 92, and the aldehydes generated when a combustion heater is operated or someone smokes in the room are adsorbed by the adsorbent 96 by the same mechanism as of Example 15. Through the use of the building material 91, the aldehyde concentration in the room never increases to high level.

Example 17 (modification of Example 15)

Figure 33A:
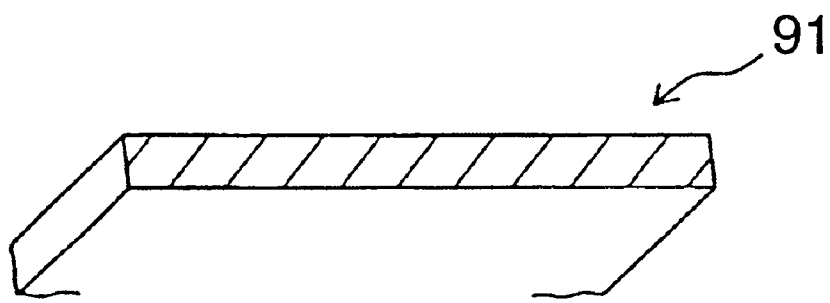
FIGS. 33A and 33B are perspective views showing another modification of the building material FIG. 31.
Figure 33B:
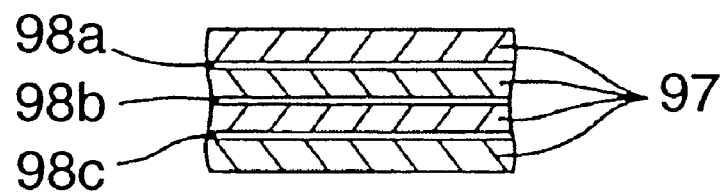

FIG. 33A shows still another type of building material 91 which is a modification of the building material 91 of Example 15, and FIG. 33B is a partially enlarged view of FIG. 33A. As shown in FIG. 33B, the building material 91 is a plywood constituted by attaching a plurality of thin plates 97 with each other via adhesive layers 89a, 89b, and 89c. The adhesive layer 98c at the lowest position contains the adsorbent.

The adsorbent contained in the adhesive layer 98c adsorbs aldehydes released not only from the adhesive layer 98c, but also aldehydes released from the adhesive layers 98a and 98b located above the adhesive layer 98c, when aldehydes generated therefrom pass through the thin plates 97 and reach the adhesive layer 98c. The aldehydes never escape from the building material 91 and the diffusion of acetaldehyde in the room can be prevented.

In Example 17, only the adhesive layer 98c at the lowest position contains the adsorbent. The adhesive layers 98a and 98b may or may not contain the adsorbent, as far as the adhesive layer 98c contains the adsorbent. If all the adhesive layers 98a to 98c contain the adhesive, the efficiency of adsorption is improved, because the respective adhesive layer 98a to 98c adsorb the acetaldehydes generated from their own adhesives.

Figure 31:
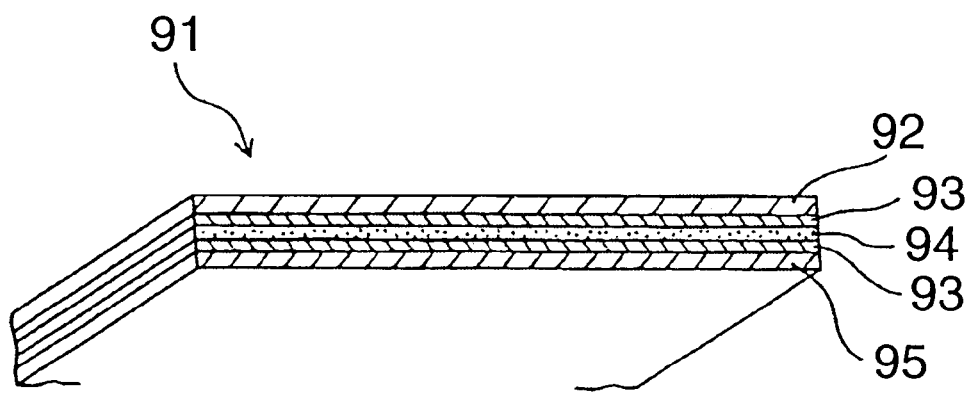
FIG. 31 is a perspective view showing a building material produced according to Embodiment 3 of the present invention.

The building material 91 shown in FIG. 31 of Example 15 may have the same structure as that of Example 17. In this case, the adsorbent sheet 94 is omitted, and the adsorbent is contained only in the adhesive layer at the lowest position among a plurality of adhesive layers used for attaching the glass fiber mat 93 and the permeable member 95 to each other, or alternatively, the adsorbent is contained in all the adhesive layers.

It is also possible to impregnate the building material 91 with the adsorbent.

Example 18

In Example 18, products other than those described in Examples 12 to 17 formed with the adsorbent of the present invention will be described. Examples of the products include items to wear, portable items, furnishings for houses and buildings, and household goods. The applications of the adsorbent are not limited to them, but the adsorbent of the present invention may be used for other various products.

Figure 34:
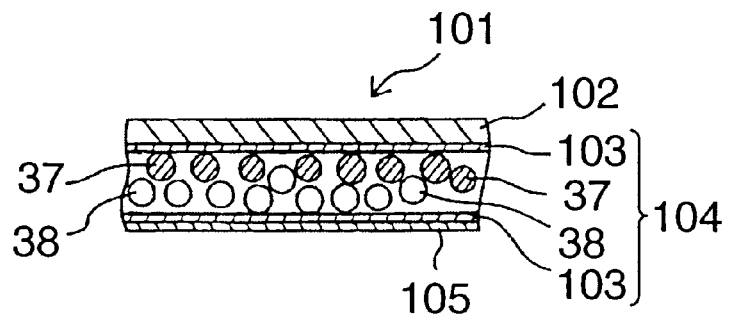
FIG. 34 is a cross-sectional view showing a product produced according to Embodiment 4 of the present invention.

A product 101 shown in FIG. 34 has a base material 102, two fiber mats 103 (woven or non-woven cloth), and an adsorbing sheet 104 formed by interposing a physical adsorbent 37 and a chemical adsorbent 38 in the form of powder between the fiber mats 103, and a permeable member 105 attached to the lower surface of the lower fiber mat 103.

In Example 18, the physical adsorbent 37 and the chemical adsorbent 38 of the same types as those used in Examples 12 to 17 are used. The physical adsorbent 37 and the chemical adsorbent 38 are arranged to be close to each other, and the physical adsorbent 37 is arranged on the base material side. The adsorbents 37 and 38 are interposed between the two fiber mats 103 which constitute the upper and lower surfaces of the adsorbing sheet 104. The arrangement of the physical adsorbent 37 and the chemical adsorbent 38s not limited to the above, but other arrangements may be employed. For example, the chemical adsorbent 38 may arranged on the base material side, or the mixture of the physical adsorbent 37 and the chemical adsorbent 38 may be used.

Over the inner surfaces of the respective fiber mats 103, a thermal fusing adhesive (not shown) is applied. The fiber mats 103 interposing the absorbents 37 and 38 are pressurized at high temperature, so that the fiber mats 103 are attached to the adhesives 37 and 38, and at the same time, they are attached to each other at their peripheral areas. The permeable member 105 is made of a material containing fibers such as a filter paper and non-woven cloth.

The product 101 formed with the adsorbing sheet 104 containing the adsorbents 37 and 38 effectively adsorbs aldehydes in the place where it is used. For example, when the product 101 is an item to wear such as cloth, the cloth adsorbs the aldehydes around the person wearing the cloth. Taking into consideration this advantage, working clothes are the preferable examples of the product 101.

Example 19 (Modification of Example 18)

Figure 35:
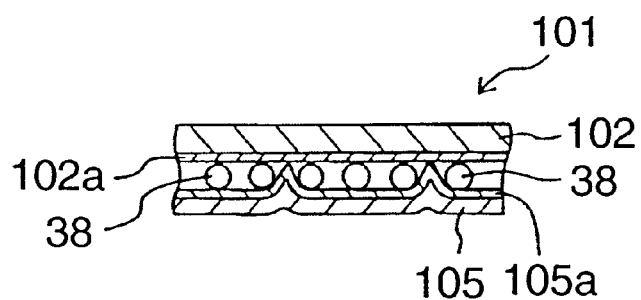
FIG. 35 is a cross-sectional view showing a modification of the produced of FIG. 34.

In Example 19, products other than that described in Example 18 formed with the adsorbent of the present invention will be described. In Example 19, only the chemical adsorbent 38 is used, and no physical adsorbent is used. The chemical adsorbent 38 is interposed between a base material 102 and a permeable leather 105, and no fiber mats 103 are used as shown in FIG. 35.

Specifically, the product 101 of Example 19 is produced by the following steps. On the base material 102, a thermal fusing adhesive 102a is applied, and the chemical adsorbent 38 is provided thereon. On the other hand, on one side of the permeable leather 105, a thermal fusing adhesive 105a is applied. The permeable leather 105 is placed on the base material 102 in such a manner that their sides coated with the adhesive are brought into contact with each other, and they are pressurized at high temperature to be attached to each other. In this manner, the chemical adsorbent 38 is interposed between the base material 102 and the permeable leather 105, and at the same time, the base material 102 and the permeable member 105 are attached to each other at specific positions of their peripheral areas and central areas.

Alternatively, on one side of the permeable leather 105, the adhesive 105a is applied, and the chemical adsorbent 38 is provided thereto. On the other hand, an adhesive 102a is applied to the surface of the base material 102. The permeable leather 105 is placed on the base material 102 in such a manner that their sides coated with the adhesives 105a and 102a are brought into contact with each other, and they are pressurized at high temperature to be attached to each other. In the above methods, the base material 102 has a layer of the adhesive 102a, and the permeable member 105 has a layer of the adhesive 105a. It is also possible that either one of them has a layer of the adhesive 102a or a layer of the adhesive 105a, respectively. In addition, only the chemical adsorbent 38 is used as the adsorbent; however, the mixture of the chemical adsorbent 38 and the physical adsorbent 37 may be used, as is the case shown in FIG. 34.

Figure 36:
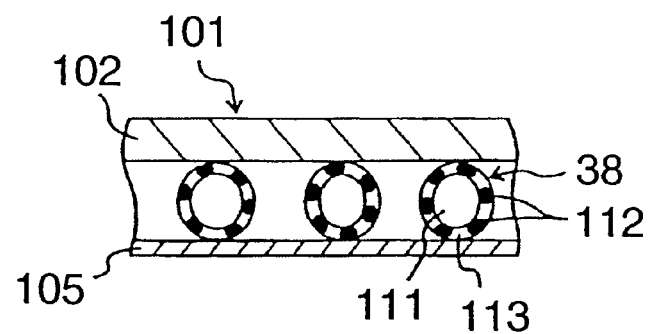
FIG. 36 is a cross-sectional view showing another modification of the product of FIG. 34.

FIG. 36 is cross-sectional view showing still another product formed with the adsorbent. The chemical adsorbent 38 contains a water-absorbing substance 111 such as zeolite and a adsorbing substance 112 such as resorcin, and the particles of the adsorbing substance 112 are attached around the surface of the water-absorbing substance 111 by the binder 113. The chemical adsorbent 38 is prepared by the following steps. The water-soluble, hydrophilic, and water-permeable binder such as polyacrylic acid, polyvinyl alcohol, and carboxymethyl cellulose is dissolved in water to prepare an aqueous solution. Into the aqueous solution, the adsorbing substance 112 is added, and the mixture is mixed with the water-absorbing substance 111 to prepare the adsorbent 38 in the form of grain. The binder 113, substantially uniformly mixed with the adsorbing substance 112, forms a layer around the particles of the water-absorbing substance 111. A large number of the particles of the adsorbing substance 112 is carried by the water-absorbing substance 111 in the state of being partially exposed without coated with the binder 113. The reactivity of the adsorbing substance 112 with the components to be adsorbed is kept to be high, and the adsorbing substance exhibits excellent adsorption.

In the product 101 shown in FIG. 36, thus-prepared chemical adsorbent 38 is interposed between the base material 102 and the permeable leather 105, as is the case of FIG. 35. In FIG. 36, although an adhesive layer is omitted, in actual, the base material 102 and the permeable leather 105 are respectively coated with adhesive layers, and are attached to each other via the adhesive layers.

In the structures shown in FIGS. 34 to 36, the physical adsorbent 37 and/or the chemical adsorbent 38 are covered with the permeable leather 105. If the adsorbents 37 and 38 are provided to the portion of the product 101 which is not exposed to the outside (i.e. a portion invisible or a portion never to be touched by person), the permeable leather 105 may be omitted.

In the structure shown in FIG. 34, the mixture of the chemical adsorbent 38 and the physical adsorbent 37 is used, and in the structure shown in FIGS. 35 and 36, only the chemical adsorbent 38 is used. Which to use between the mixture of the adsorbents 37 and 38 or the chemical adsorbent 38 is determined in accordance with the components to be adsorbed.

In the structures shown in FIGS. 34 to 36, the adsorbents 37 and 38 are provided on the base material 52. However, the position of the adsorbents 37 and 38 is not limited thereto, and may be properly determined in accordance with the product to which the adsorbents 37 and 38 are to be provided. For example, the adsorbent 37 and 38 may be used in the state of being held in a storage box.

Example 20

The influence of the crystal structure of zeolite on the adsorption performance was examined. The adsorbent G using ZSM5-type zeolite, and adsorbents R and S for comparison using Y-type zeolite and X-type zeolite (both of them are H-type) respectively were prepared. Although the adsorbents R and S contained water-absorbing substances different from that contained in the adsorbent G, they were prepared by the same steps of preparing the adsorbent G. The adsorbents G, R, and S in an amount of 0.2 g respectively were put into a thin glass tube, and the air containing acetaldehyde of 10 ppm in concentration was supplied from the upstream side at a flow rate of 0.6 m/s. The acetaldehyde concentration was checked on the downstream side to examine the rate of removing the acetaldehyde.

Figure 37:
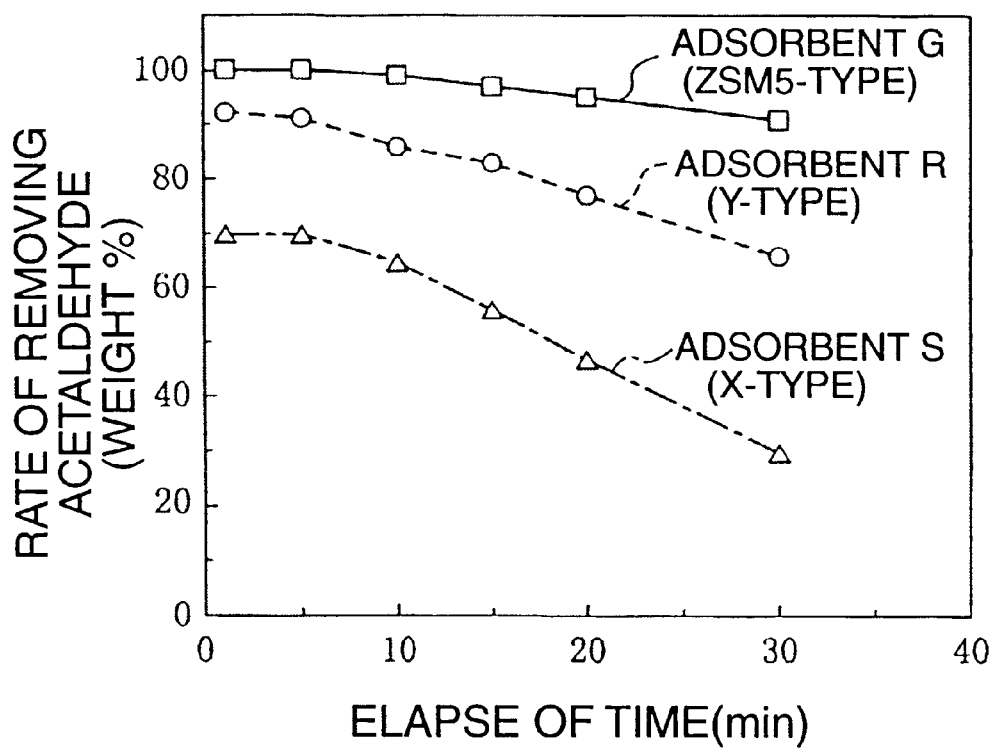
FIG. 37 is a graph showing the results of the test of Example 9.

FIG. 37 shows the results of the test. As seen in FIG. 37, the adsorbent G containing ZSM5-type zeolite had higher ability of adsorbing acetaldehyde, as compared with the adsorbents R and S containing Y-type and X-type zeolites.

Next, the influence of the silica-alumina ratio of H-and ZSM5-type zeolite on the adsorption performance was examined. That is, 0.2 g of the adsorbent G having a silica-alumina ratio of 80, 0.2 g of an adsorbent T having a silica-alumina ratio of 30, and an adsorbent U having a silica-alumina ratio of 280 were prepared. By repeating the steps of the test for examining the influence of the crystal structure of zeolite, the rate of removing acetaldehyde was checked.

Figure 38:
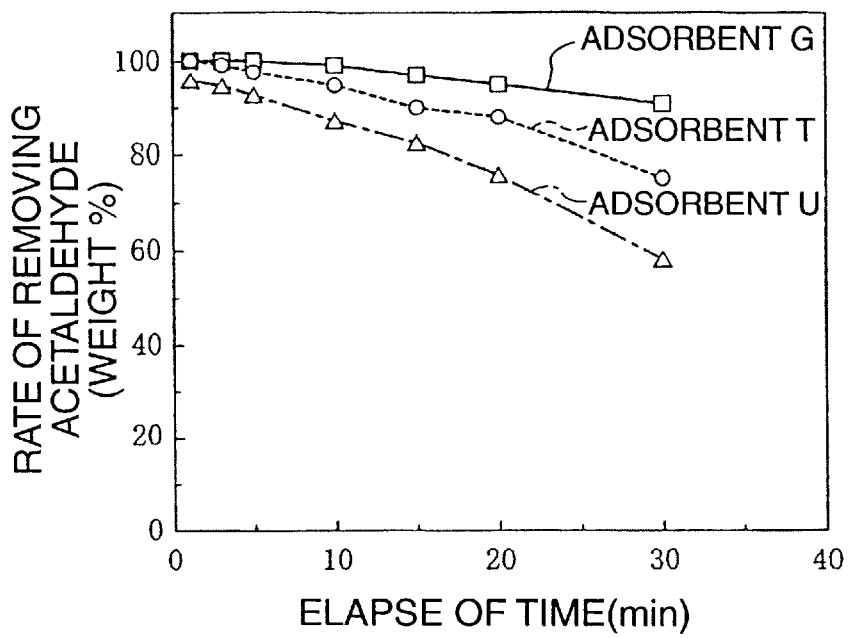
FIG. 38 is a graph showing the results of the test of Example 9.

FIG. 38 shows the results of the test. As seen in FIG. 38, H- and ZSM5-type zeolite showed the best adsorption performance at the silica-alumina ratio of 80.

Example 21

Figure 39:
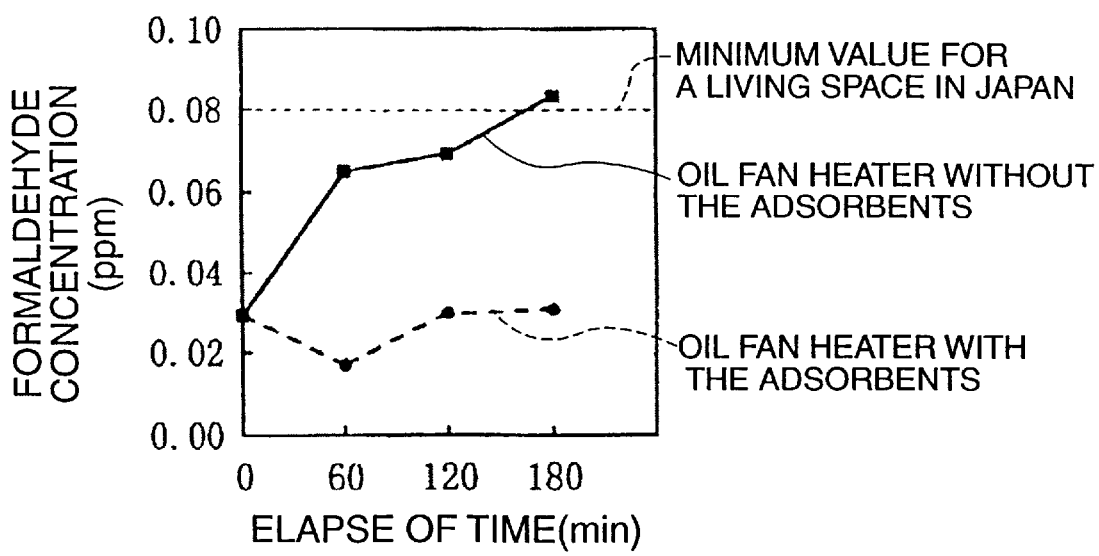
FIG. 39 is a graph showing the results of the test of Example 10.

The oil fan heater 70 used in Example 12 was placed in a room (Japanese style room with 6 tatami mats) and was operated. The change in the formaldehyde concentration in the room was examined, and the results of the examination are shown in FIG. 39. A solid line corresponds to the case where the oil fan heater 70 contained no adsorbent, and a broken line corresponds to the case where the oil fan heater 70 had filters 13 containing the adsorbents 37 and 38. Each of the filters 13 had an surface area of 400 cm$^2$, and the air was passed through the filters 13 at a flow rate of 1 m/sec. The respective filters 13 contained the physical adsorbent 37 and the chemical adsorbent 38 at a weight ratio of 10:2. Specifically, as the physical adsorbent 37, 4 g of an activated charcoal was used, and as the chemical adsorbent 38, 20 g of the adsorbent G was used.

As seen in FIG. 39, the formaldehyde concentration increased in accordance with the elapse of time when the oil fan heater 21 without adsorbents 37 and 38 was operated. After about 3 hours, the formaldehyde concentration exceeded the guideline defined as a minimum value for a living space in Japan. Contrary to this, when the oil fan heater with the adsorbents 37 and 38 was operated, the formaldehyde concentration was not changed with the elapse of time, and was kept to low level. From these results, the adsorbents 37 and 38 effectively adsorbed the formaldehyde generated from the oil fan heater 70.

Example 22

Figure 40:
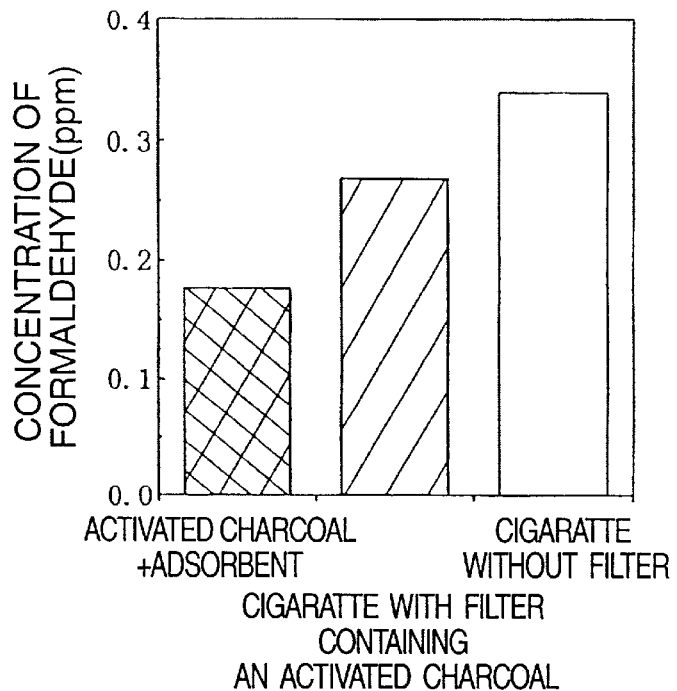
FIG. 40 is a graph showing the results of the test of Example 11.
Figure 41:
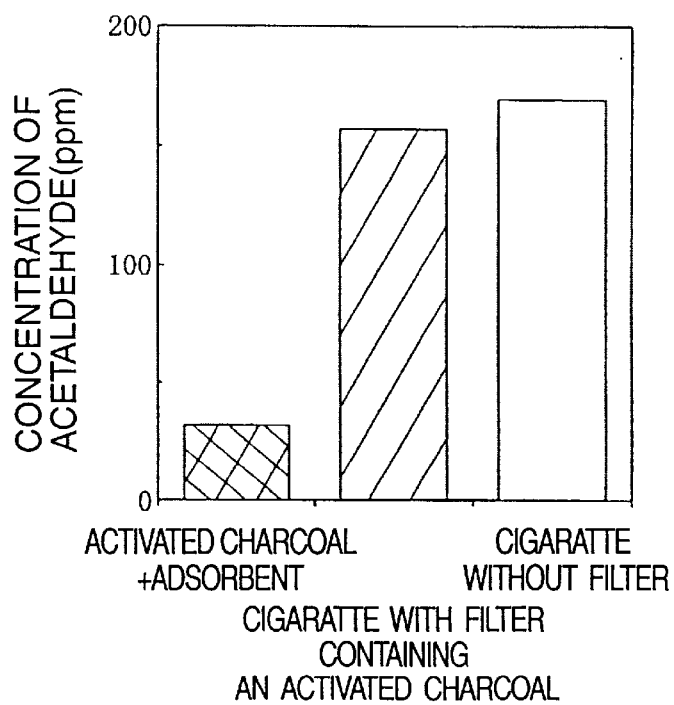
FIG. 41 is a graph showing the results of the test of Example 11.

The adsorption performance for formaldehyde and acetaldehyde was examined as to a cigarette having a filter containing the chemical adsorbent and an activated charcoal (the physical adsorbent), a cigarette having a filter containing an activated charcoal, and a cigarette having no filter. FIGS. 40 and 41 show the results of the test. In this test, 0.2 g of the chemical adsorbent, and 0.05 g of the activated charcoal were respectively used for one cigarette, and the smoking speed was 1 liter/min. As seen in FIGS. 40 and 41, in the case of the cigarette having a filter containing the chemical adsorbent and the physical adsorbent, the concentration of the formaldehyde and acetaldehyde was remarkably low as compared with two other cigarettes. From this result, the adsorbents 37 and 38 effectively adsorbed the formaldehyde and acetaldehyde generated from the cigarette.

INDUSTRIAL APPLICABLITY

According to the present invention, it is possible to provide a composition for use in adsorption treatment which is easy to handle; a method for easily preparing the composition in the form of grains without inhibiting its adsorption ability; products such as an adsorption treatment device and a filter for air-cleaning formed with the composition; and a method of adsorption treatment.

What is claimed is:

1. A composition for use in adsorption treatment including an adsorbing substance which is reactive with components to be adsorbed in the presence of moisture, a water-absorbing substance, and a binder, wherein the binder is 1.3 to 8 weight percent with respect to the water-absorbing substance.

2. A composition for use in adsorption treatment according to claim 1, wherein the components to be adsorbed are carbonyl group-containing compounds, and a component used as the adsorbing substance is at least one of the compounds selected from the group consisting of monohydric phenol, polyhydric phenol, and derivatives thereof.

3. A composition for use in adsorption treatment according to claim 2, formed into grains having an average grain diameter of 0.1 to 1 mm.

4. A composition for use in adsorption treatment according to claim 2, wherein the binder is 1.3 to 3 weight percent with respect to the water-absorbing substance.

5. A composition for use in adsorption treatment according to claim 2, wherein the binder is a water-soluble polymer.

6. A composition for use in adsorption treatment according to claim 5, wherein the water-soluble polymer is polyvinyl alcohol.

7. A composition for use in adsorption treatment according to claim 2, wherein the adsorbing compound is 0.1 to 50 weight percent with respect to the water-absorbing substance.

8. A composition for use in adsorption treatment according to claim 7, wherein the adsorbing compound is 20 weight percent or less with respect to the water-absorbing substance.

9. A composition for use in adsorption treatment according to claim 2, wherein the adsorbing compound is odorless polyhydric phenol.

10. A composition for use in adsorption treatment according to claim 9, wherein the polyhydric phenol is resorcin.

11. A composition for use in adsorption treatment according to claim 9, wherein the water-absorbing substance is at least one selected from the group consisting of water-absorbing inorganic substance and water-absorbing polymer.

12. A composition for use in adsorption treatment according to claim 11, wherein the water-absorbing inorganic substance is at least one selected from the group consisting of silica gel, zeolite, alumina, and silious earth.

13. A composition for use in adsorption treatment according to claim 11, wherein the water-absorbing polymer is at least one selected from the group consisting of modified starch, modified cellulose, and a polymer or a copolymer of acrylic acid or the salt thereof, acrylamides, maleic acids, ethylene oxides, or vinyl alcohol.

14. A composition for use in adsorption treatment according to claim 9, further comprising a physical adsorbent capable of adsorbing the components to be adsorbed.

15. A composition for use in adsorption treatment according to claim 14, wherein the physical adsorbent is an activated charcoal.

16. A composition for use in adsorption treatment according to claim 9, further comprising a weak acidic substance or a weak basic substance.

17. An adsorption treatment device mounted to an air-conditioner, comprising the composition for use in adsorption treatment of claim 1.

18. A filter for air cleaning comprising the composition for use in adsorption treatment of claim 1.

19. A member in the shape of sheet installed to a ceiling of a room in a house and building, comprising the composition for use in adsorption treatment of claim 1.

20. A building material comprising volatile components to be adsorbed, and an adsorbent for adsorbing the volatized components, wherein the adsorbent includes the composition for use in adsorption treatment of claim 1.

21. A product comprising an adsorbent for adsorbing components to be adsorbed in a gas to be treated, wherein the product is selected from the group consisting of items to wear, portable items, furnishings for houses and buildings, and household goods, wherein the adsorbent includes the composition of claim 1.

22. A product comprising a combustion part, and an adsorbent for adsorbing components to be treated in the gas generated from the combustion part, wherein the adsorbent includes the composition for use in adsorption treatment of claim 1.

23. A product according to claim 22, wherein the product is a combustion heater.

24. A product according to claim 23, wherein the combustion heater is a combustion hot air type heater.

25. A product according to claim 22, wherein the product is a cigarette.

26. A method for producing an adsorbent including an adsorbing substance which is reactive with components to be adsorbed in a gas to be treated in the presence of moisture, and a water-absorbing substance which carries the adsorbing substance and supplies moisture to the adsorbing substance when the adsorbing substance reacts with the components to be adsorbed, comprising the steps of:
  mixing the adsorbing substance and a binder for binding the particles of the adsorbing substance to each other; and mixing the mixture with the water-absorbing substance to prepare the adsorbent in the form of grains.

27. The production method according to claim 26, wherein the binder is water-soluble, hydrophilic, and water-permeable, and is dissolved in water to prepare an aqueous solution, and the aqueous solution is mixed with the adsorbing substance.

28. The production method according to claim 27, wherein the adsorbing substance is a water-soluble substance.

29. A method for producing an adsorbent including an adsorbing substance which is reactive with components to be adsorbed in a gas to be treated in the presence of moisture, and a water-absorbing substance which carries the adsorbing substance and supplies moisture to the adsorbing substance when the adsorbing substance reacts with the components to be adsorbed, comprising the steps of:
  mixing the water-absorbing substance and a binder for attaching particles of the water-absorbing substance to each other to form grains; and the grains are mixed with the adsorbing substance to allow the water-absorbing substance in the form of grain to carry the absorbing substance.

30. The production method according to any one of claims 26 to 29, wherein the adsorbing substance is at least one of the compounds selected from the group consisting of monohydric phenols, polyhydric phenols, and derivatives thereof.

31. The production method according to any one of claims 26 to 29, wherein the water-absorbing substance is zeolite.

32. The production method according to any one of claims 26 to 29, wherein the adsorbing substance is 0.1 to 50 weight percent with respect to the water-absorbing substance.

33. The production method according to any one of claims 26 to 29, wherein the binder is 1.3 to 8 weight percent with respect to the water-absorbing substance.

* * * * *